United States Patent [19]
Ramsey

[11] Patent Number: 5,157,617
[45] Date of Patent: Oct. 20, 1992

[54] ASSEMBLING APPARATUS INCLUDING MEANS FOR MATCHING CODED SHEETS

[75] Inventor: James S. Ramsey, Shelton, Conn.

[73] Assignee: Pitney Bowes Inc., Stamford, Conn.

[21] Appl. No.: 577,726

[22] Filed: Sep. 5, 1990

[51] Int. Cl.$^5$ .............................................. G06F 15/20
[52] U.S. Cl. ...................... 364/478; 270/45
[58] Field of Search ................ 364/471, 478; 270/45, 270/58; 271/3.1; 53/493

[56] References Cited

U.S. PATENT DOCUMENTS 4,796,196 1/1989 Durst, Jr. et al. .................. 364/478
4,800,504 1/1989 Durst, Jr. et al. .................. 364/478

*Primary Examiner*—Jerry Smith
*Assistant Examiner*—Paul Gordon
*Attorney, Agent, or Firm*—Donald P. Walker; Melvin J. Scolnick

[57] ABSTRACT

Apparatus for assembling sheets comprising: portable structure for supporting a first plurality of sheets in a predetermined order in a stack, said portable structure including memory structure having stored therein a plurality of codes listed in said predetermined order, each of said codes including data identifying one of the sheets of said stack; structure for receiving a second plurality of sheets respectively including an identity code; structure for comparing codes for relatedness thereof; and structure for collating first and second sheets identified by related codes.

11 Claims, 12 Drawing Sheets

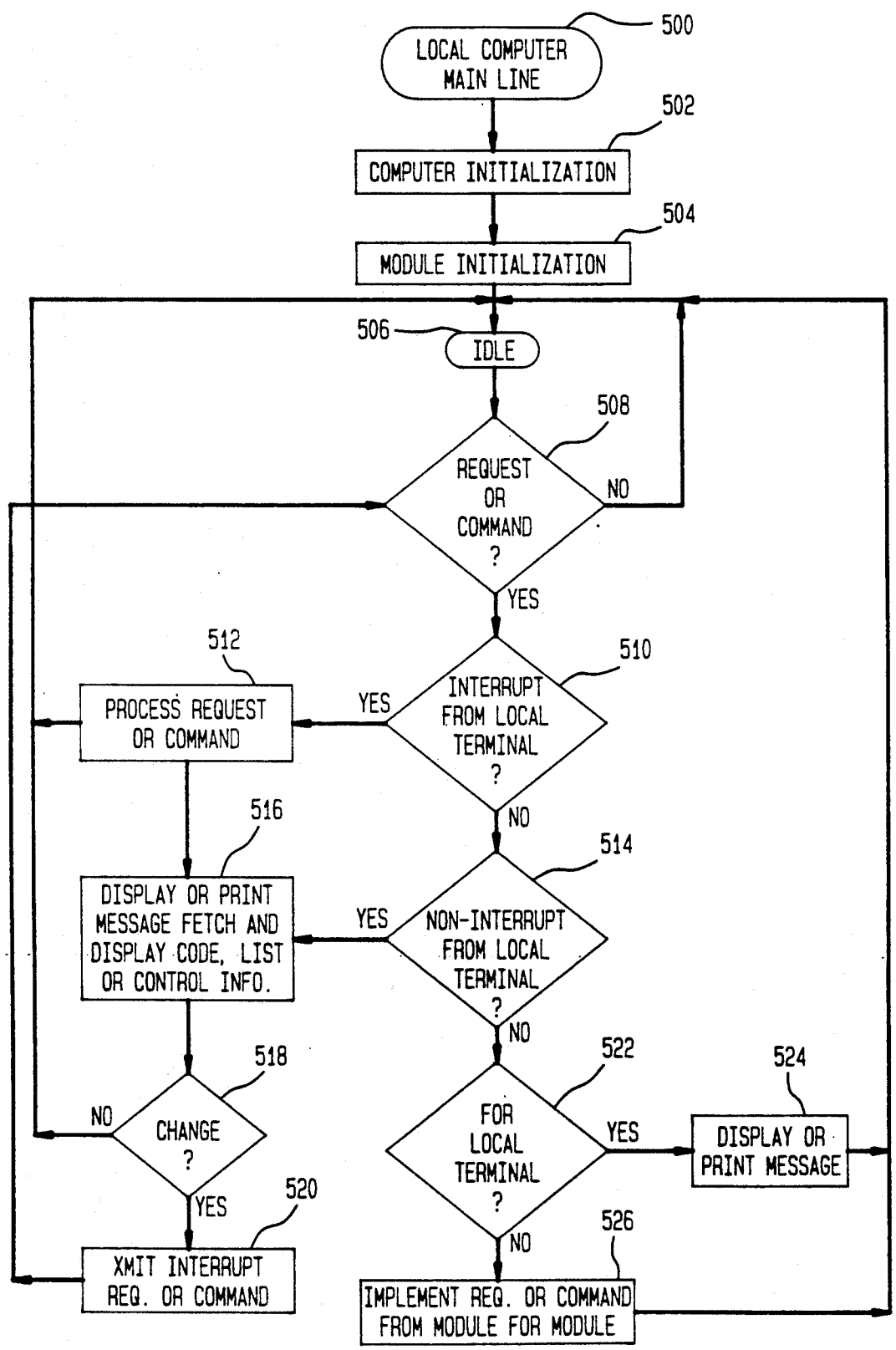

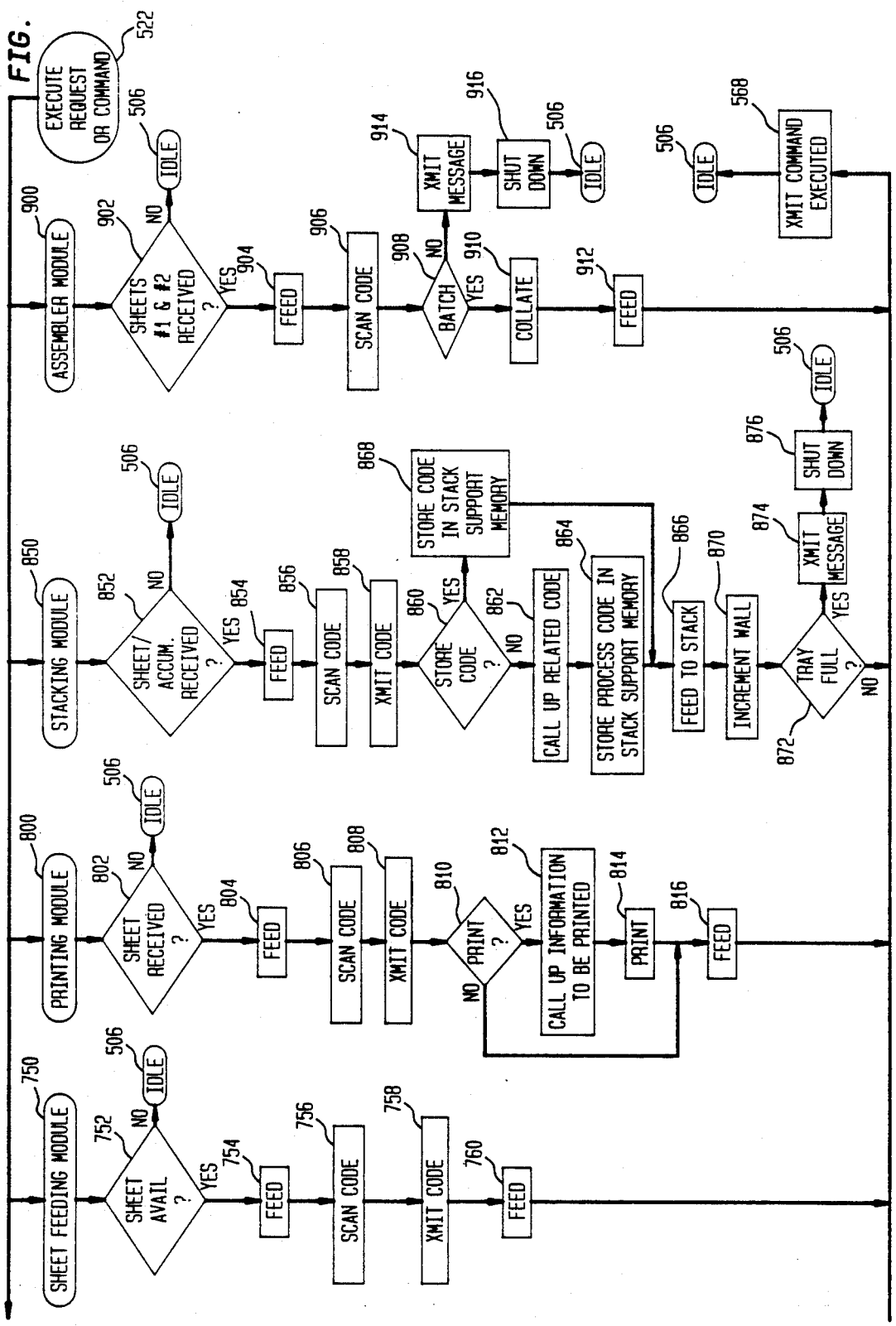

ASSEMBLING APPARATUS INCLUDING MEANS FOR MATCHING CODED SHEETS

BACKGROUND OF THE INVENTION

This invention is generally concerned with methods and apparatus for processing sheets and more particularly with methods and apparatus for identifying and stacking sheets for further processing.

This application is one of the following five related U.S. Patent Applications filed concurrently herewith by James, S. Ramsey and assigned to the same Assignee: Ser. No. 07/577,721, now U.S. Pat. No. 5,092,575 for Portable Apparatus for Supporting Sheets; Ser. No. 07/577,712 for Methods of Processing Sheets Having An Order Corresponding to the Order of Stored Data; Ser. No. 07/577,726 for Assembling Apparatus Including Means for Matching Coded Sheets; Ser. No. 07/577,728 for Sheet Processing Apparatus Including Memory Means Removably Connected Thereto; and Ser. No. 07/577,724, now U.S. Pat. No. 5,027,587 for Methods and Apparatus For Controlling An Inserter.

Large business mailers prepare and process various types of business mail utilizing high speed inserters to collate the sheets and stuff the same into envelopes for mailing purposes. Depending upon the preference of its customers, business mailers may be provided with a web of sheets, individual cut sheets, cards or forms, multi-sheet letters, or envelopes, with or without windows, or other sheets which must be stacked in trays at various sheet feeding stations of the inserter for processing purposes.

In a typical inserter, the first sheet which is fed from an insert station and into the path of travel for collation with other inserts is called a control document due to this sheet bearing a processing code which is scanned by conventional sensing structure for use by the controller of the inserter to selectively cause one or more downstream insert stations to feed sheets into the path of travel for collation with the control document.

When the sheets of a given stack that are used by an inserter are interchangeable with one another, they may be prepared by sheet processing equipment which is connected "in-line" with the insert or envelope station from which the sheets are to be fed by the inserter. This is also the case when the only stack of sheets bearing information which differs from sheet to sheet is the stack of control documents. On the other hand, if any two stacks of sheets, including for example the control document stack, includes sheets that are different from one another and must be matched with a one another, then, such sheets are preferably collated with one another "off-line" from the inserter, to ensure that matching occurs without incurring the penalty of inserter down time. Whereupon the collated sheets may be stacked at an insert station, including the first, i.e., most upstream station of the inserter, for collation with other inserts in accordance with the processing code of the control document.

Thus it is generally known in the art to provide apparatus connected in-line with an inserter for feeding like sheets to an insert or envelope station, to provide in-line apparatus for feeding control documents to the first upstream sheet feeding station of an inserter, and to provide off-line apparatus for preparing collations of control documents with matched inserts and matching inserts with one another. Accordingly:

An object of the present invention is to provide improved methods and apparatus for processing sheets and webs thereof off-line from an inserter;

Another object is to provide improved methods and apparatus for preparing stacks of sheets off-line from an inserter;

Another object is to provide methods of processing sheets having an order corresponding to the order of stored data;

Another object is to provide improved methods and apparatus for matching sheets with one another; and Yet another object is to provide portable sheet supporting structure.

SUMMARY OF THE INVENTION

Apparatus for assembling sheets comprising: portable means for supporting a first plurality of sheets in a predetermined order in a stack, said portable means including memory means having stored therein a plurality of codes listed in said predetermined order, each of said codes including data identifying one of the sheets of said stack; means for receiving a second plurality of sheets respectively including an identity code; means for comparing codes for relatedness thereof; and means for collating first and second sheets identified by related codes.

BRIEF DESCRIPTION OF THE DRAWINGS

FIG. 8 is a flow chart of the main line program of the local computer; and

FIGS. 9a and 9b are flow charts of various apparatus module routines.

DESCRIPTION OF THE PREFERRED EMBODIMENTS

Figure 1A:
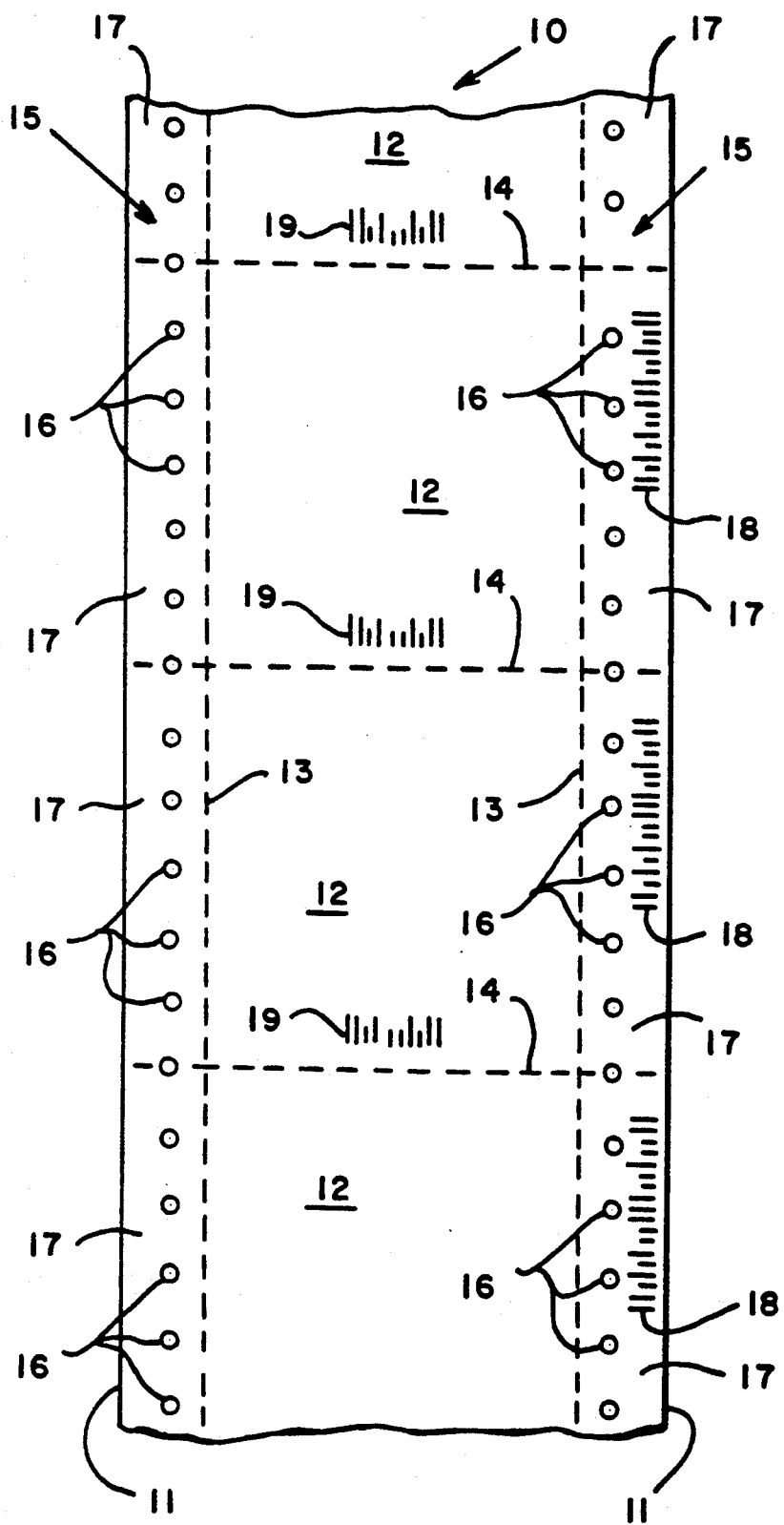
FIG. 1a is a plan view of a web of typical sheets.

As shown in FIG. 1a an elongate web 10, of the type which may be processed in accordance with the invention, generally comprises an elongate web of paper having opposed, longitudinally-extending, side edges. The web 10 includes a plurality of successive, uniformly dimensioned, sheets 12. For the purpose of this discussion, the sheets 12 are shown to be serially defined in the web 10, longitudinally of the length thereof, by means of a pair of parallel-spaced, longitudinally-extending, dashed lines 13 marked thereon, as by printing, and a plurality of parallel-spaced, transversely-extending, perforate lines 14 formed in the web 10 at equal intervals longitudinally of the length thereof. The side edges 11 and dashed lines 13 additionally define a pair of elongate, parallel-spaced, marginal edges 15, each of which has a plurality of sprocket holes 16 which are formed therein at equidistantly spaced intervals longitudinally of its length. And, each adjacent pair of the transverse perforate lines 14 defines a portion 17 of the marginal edge 15 which borders the sheet 12 between such lines 14.

Notwithstanding the foregoing discussion, it is noted that the marked lines 13 (FIG. 1a) are not typically provided. Thus the lines 13 may be imaginary lines 13. Moreover, the web 10 need not include the opposed longitudinally-extending marginal edges.

Further, in the preferred embodiment, one of the marginal edge portions 17 (FIG. 1a) bordering each sheet 12 has printed thereon a processing code 18, which may be any code but is preferably a bar code and, in particular, the bar code known in the art as a "three of nine" code which provides 79,507 different code combinations for identifying as many elements of information. Thus the code 18 may embody or include data corresponding to the complete address of the addressee of the bordered sheet 12, including but not limited to a postal bar code representative of the postal zip code corresponding to the mailing address of the addressee, a unique key code identifying the particular bordered sheet 12, information pertaining to operations that are to be performed on the sheet in the course of processing the same, for example, pertaining to the operations that are to performed by one or more of the apparatus modules under the local computer hereinafter described, information concerning the identity and number of successive sheets of the web 10 which are to be included in a collation with the bordered sheet 12, or any other suitable information concerning the processing of the bordered sheet 12. In addition, each of the sheets 12 may or may not have printed thereon a key code 19 which is related to the aforesaid processing code. Assuming the provision of a key code 19, it may be used for identifying the particular sheet 12 and used as a pointer by the aforesaid local computer for identifying the related processing code 18. As thus coded, the processing code 18 bordering a particular sheet 12 may be sensed and stored in a device, such as the local computer hereinafter described, for later reference in response to sensing the key code 19.

Figure 1B:
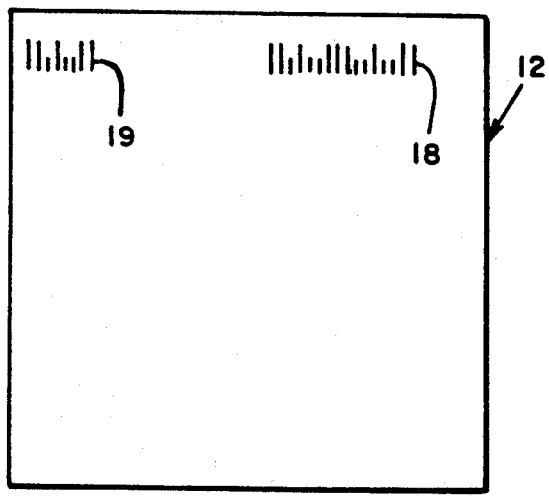
FIG. 1b is a plan view of a typical sheet, such as a cut sheet, card, letter or other sheet.
Figure 1D:
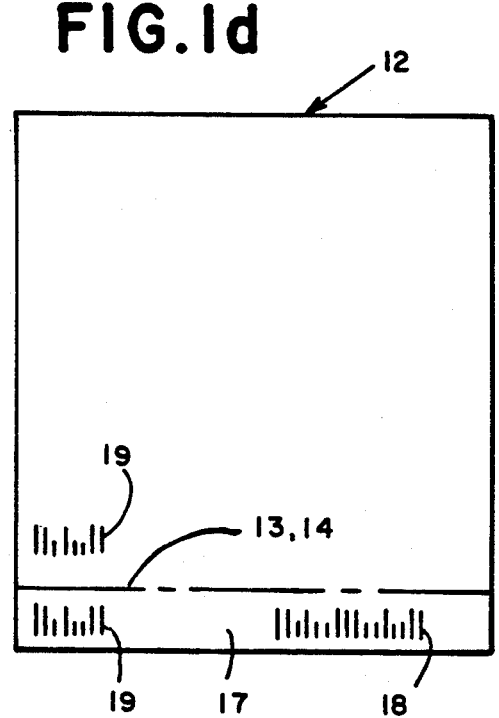
FIG. 1d is a plan view of yet another typical sheet having a separable marginal edge portion.
Figure 1C:
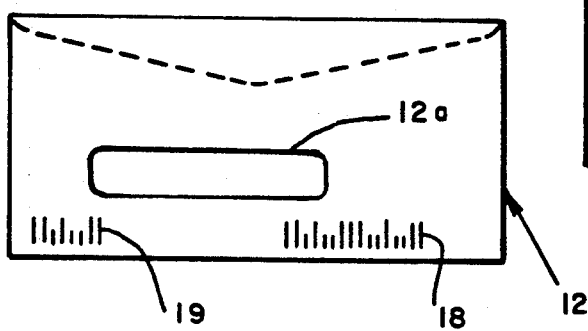
FIG. 1c is a plan view of another typical sheet, such as an envelope, or without a window.
Figure 1E:
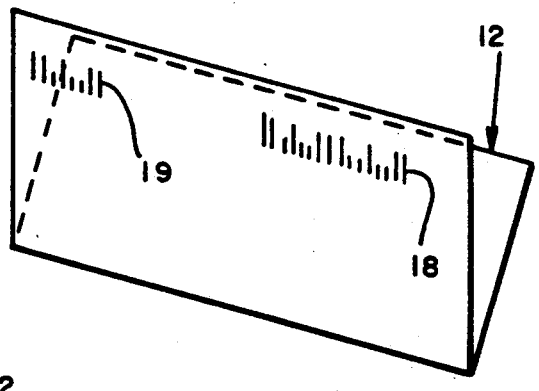
FIG. 1e is a perspective view of a typical folded sheet.

As shown in FIG. 1b, another sheet 12 of the type which may be processed in accordance with the invention comprises a card, pre-printed, form, return envelope, letter, or other sheet 12, having either a processing or key code, 18 or 19, printed thereon. Further, as shown in FIG. 1c, yet another type of sheet 12 that may be processed in accordance with the invention comprises an envelope 12, with or without a conventional window 12a formed therein, having either a processing or key code, 18 or 19, printed thereon. Moreover, as shown in FIG. 1d, a still further type of sheet 12 which may be processed in accordance with the invention is one that initially has attached thereto a marginal edge portion 17 which does not include the sprocket holes 16 (FIG. 1a) but does include a processing code 18 (FIG. 1d) or key code 19 marked thereon. Moreover, the marginal edge portion 17 may be defined by a dashed line 13 or perforate line 14, and the sheet 12 may or may not have printed thereon a key code 19 related to the processing code 18. And, as shown in FIG. 1e, yet another type of sheet 12 which may be processed in accordance with the invention comprises a folded sheet 12 (FIG. 1b).

Figure 2A:
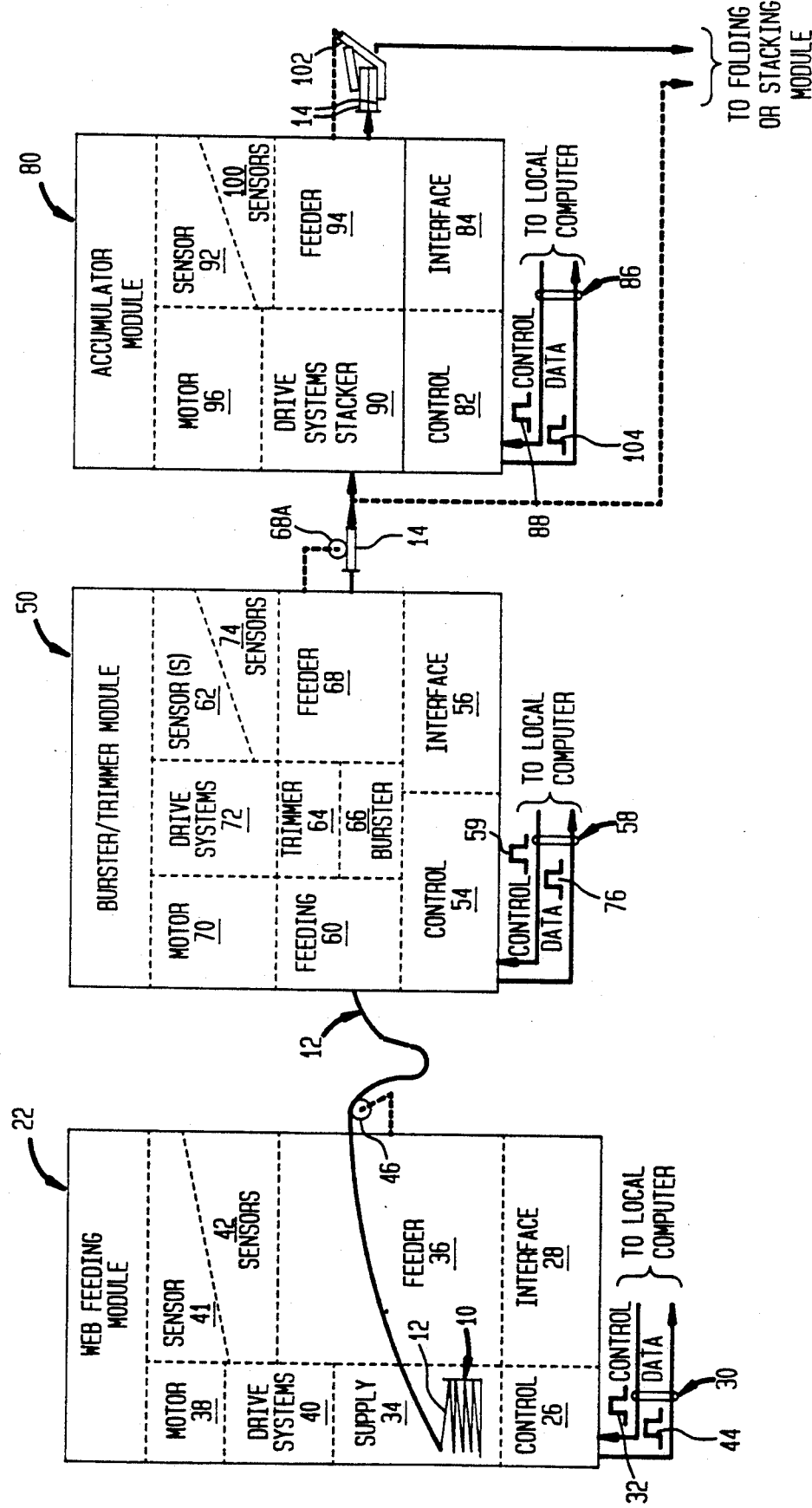
FIGS 2a and 2b are block diagrams of various web processing systems of apparatus according to the invention.
Figure 2B:
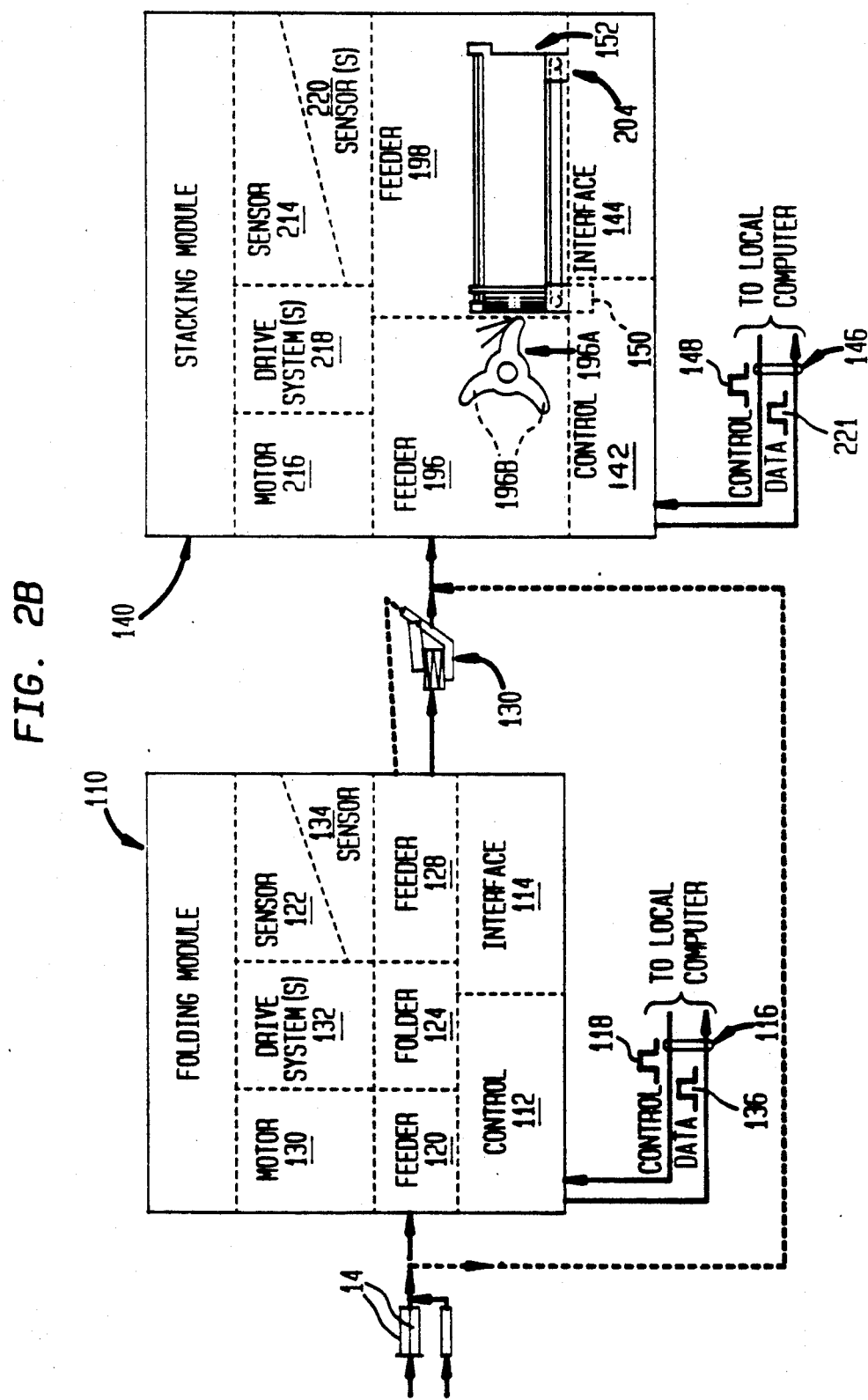

As shown in FIG. 2, a system of apparatus 20 of the type which may be used for processing the above described web 10 (FIG. 1a) may include a conventional web sheet feeding module 22 (FIG. 2) into which the web 12 may be loaded for feeding purposes.

The web feeding module 22 (FIG. 2), which is preferably a conventional, stand-alone device, includes suitable control structure 26, such as a microprocessor, for controlling the various structures and functions of the module 22. In addition, the module 22 may include a conventional operator interface 28, such as a keyboard which is conventionally coupled to the control structure 26 for operation thereof in response to input signals from the keyboard. Whether or not the module 22 includes the operator interface 28, the control structure 26 is preferably conventionally adapted to include a two-way serial or parallel communication link 30 for conventionally coupling the control structure 26 to an external source, such as the local computer hereinafter described, for operation of the module 22 in response to control signals, such as the signal 32, received from the external source. Thus the module 22 is preferably adapted to permit control of the structures and functions thereof from an external source rather than from an operator interface 28.

The web feeding module 22 (FIG. 2) additionally includes conventional web supplying structure 34 into which the web 10 of sheets 12 may be loaded. In addition, the module 22 includes conventional web feeding structure 36. The feeding structure 36 may be any conventional sprocket-wheel type or roller-type structure for engaging and feeding the web 10. Further, the web feeding module 22 includes a motor 38 and one or more drive systems 40 for the feeding structure 36. The web feeding module 22 may also include one or more conventional sensing structures 41 for sensing the processing and key codes, 18 and 19 (FIG. 1a) and a plurality of conventional sensors 42 (FIG. 2) for sensing marks on the web which define the location of the leading or trailing edges of respective sheets 12, and for sensing various positions at respective time intervals of an elements of the motor 38 for establishing the position and angular velocity of the motor 38, and for sensing various positions of structures driven by the motor 38 and positions of elements of of the drive systems 40, including their respective home positions. The sensors 41 and 42 are preferably conventionally coupled to the control structure 26, whereby the control structure 26 may provide digital signals, such as the signal 44, to the external source which correspond to the processing code 18 and key code 19, and for indicating various positions of a given sheet 12, and of elements the motor 42 and drive systems 40. In addition, the feeding structure 36 may include conventional means, including a roller 46, for feeding the respective sheets 12 from the feeding module 22.

The system of apparatus 20 (FIG. 2) additionally includes a conventional bursting and trimming module 50, for receiving a web 10 fed from the web feeding module 22, sensing the processing and key codes, 18 and 19 (FIG. 1a), trimming or otherwise separating, e.g. as by cutting, the marginal edges 15 (FIG. 2) from the opposite sides of the web 10, and bursting, or otherwise separating, e.g. as by cutting, the respective sheets 12, in seriatim, from the remainder of the web 10.

The bursting and trimming module 50 (FIG. 2), which is preferably a conventional, stand-alone device, includes suitable control structure 54, such as a microprocessor, for controlling the various structures and functions of the module 50, and may include a conventional operator interface 56, such as a keyboard which is conventionally coupled to the control structure 54 for operation thereof in response to input signals from the keyboard. Whether or not the module 50 includes an operator interface 56, the control structure 54 is preferably conventionally adapted to include a two-way serial or parallel communication link 58 for conventionally coupling the control structure 54 to an external source, such as the local computer hereinafter described, for operation of the control structure 54 in response to control signals, such as the signal 59, received from the external source. Thus the module 50 is preferably adapted to permit control of the structure and functions thereof from an external source rather than from the operator interface 56.

The bursting and trimming module 50 (FIG. 2) includes web feeding structure 60, such as any conventional sprocket-wheel type or roller-type structure, for engaging and feeding the web 12 into the module 50. In addition, the module 50 includes one or more conventional sensing structures 62, operatively coupled to the control structure 54, for sensing the processing and key codes, 18 and 19 (FIG. 1a). Moreover, the module 50 (FIG. 2) includes conventional trimming structure 64, such as a plurality of disc-type cutters aligned with and disposed in cutting engagement with each marginal edges 15, for example the lines 13 (FIG. 1a), of the web 10, for continuously separating the marginal edge 15 from the web 10. And the module 50 (FIG. 2) includes conventional bursting structure 66 for separating the respective sheets 12 in seriatim from the web 10, such as a conventional arrangement of bursting rollers. Still further, the module 50 includes suitable sheet feeding structure 68, including a roller 68A, for feeding the sheets 12 one at a time from the module 50. In addition, the module 50 includes a motor 70 and one or more drive systems 72 for the feeding structures 60 and 68. And the module 50 includes a plurality of conventional sensors 74 for sensing various positions of the sheets 12, and elements of the motor 70 and drive units 72 at respective time intervals, for determining the velocity and positions thereof, including their respective home positions. The sensors, 62 and 74, are preferably conventionally coupled to the control structure 54, whereby the control structure 54 may provide digital signals, such as the signal 76, to the external source which correspond to the codes, 18 and 19, and to various positions of the sheets 12, and the position at various time intervals of the elements of motor 70 and of the drive units 72.

Assuming a plurality of successive sheets 12 (FIG. 2) which are fed from the bursting and trimming module 50 are to be accumulated before folding or stacking the same, the system of apparatus 20 may also include a conventional sheet accumulating module 80, for receiving successive sheets 12 fed from the bursting and trimming module 50, sensing the key code 19 (FIG. 1a) printed thereon and stacking the same.

The sheet accumulating module 80 (FIG. 2), which is preferably a conventional stand-alone device, includes suitable control structure 82, such as a microprocessor, for controlling the various structures and functions of the module 80, and may include a conventional operator interface 84, such as a keyboard which is conventionally coupled to the control structure 82 for operation thereof in response to input signals from the keyboard. Whether or not the module 80 includes an operator interface 84, the control structure 82 is preferably conventionally adapted to include a two-way serial or parallel communication link 86 for conventionally coupling the control structure 82 to an external source, such as the local computer hereinafter described, for operation of the control structure 82 in response to control signals, such as the signal 88, received from the external source. Thus the module 80 is preferably adapted to permit control of the structure and functions thereof from an external source rather than from the operator interface 84.

The sheet accumulating module 80 (FIG. 2) includes sheet stacking structure 90, such as any conventional bin for receiving successive sheets 14 from the bursting and trimming module 50. In addition, the module 80 may include sensing structure 92 which is operatively coupled to the control structure 82 for sensing the key code 19 printed on each sheet 12. In the preferred embodiment, in response to sensing the key code 19, the external source provides data signals 88 determining the number of successive sheets 12 that are to be accumulated. In this connection it is noted that the external source is able to provide such signals 88 inasmuch as the processing code 18 (FIG. 1a) printed along the marginal web 15 of the web 10, and sensed by the sensor 62 (FIG. 2) of the bursting and trimming module 50, is normally stored in the external source before removal of the marginal edge 15 (FIG. 1a) of the web 10, and that the code 18 may include information corresponding to the number of sheets 12 that are to be accumulated. Still further, the module 80 is provided with suitable feeding structure 94, including a conventional arrangement of sheet gripping fingers 102, for grasping and feeding the respective accumulations of sheets 12, one at a time, from the module 80. In addition, the module 80 includes a motor 96 and one or more drive units 98 for the feeding structure 94. And the module 80 includes a plurality of conventional sensors 100 for sensing various positions of sheets 12, and of elements the motor 96 and drive units 98, at respective time intervals, including their respective home positions. The sensors, 92 and 100, are preferably conventionally coupled to the control structure 82, whereby the control structure 82 may provide digital signals, such as the signal 104, to the external source which correspond to the key codes 19 printed on the sheets 12, various positions of the sheets 12, and various positions at respective time intervals of elements of the motor 96 and drive system(s) 98.

Assuming the sheets 12 (FIG. 2), or accumulations thereof, as the case may be, are to be folded before stacking the same, the system of apparatus 20 may additionally includes a conventional folding module 110, for receiving respective sheets 12 from the bursting and trimming module 50 or respective accumulations of sheets 12 from the sheet accumulating module 80, as the case may be, sensing the key codes 19 printed on respective sheets 12, or on a given sheet of each accumulation thereof, and folding the same.

The folding module 110 (FIG. 2), which is preferably a conventional, stand-alone device, includes suitable control structure 112, such as a microprocessor, for controlling the various structures and functions of the module 110, and may include a conventional operator interface 114, such as a keyboard which is conventionally coupled to the control structure 110 for operation thereof in responses to input signals from the keyboard. Whether or not the module 110 includes an operator interface 114, the control structure 112 is preferably conventionally adapted to include a two-way serial or parallel communication link 116 for conventionally coupling the control structure 112 to an external source, such as the local computer hereinafter described, for operation of the control structure 112 in response to control signals, such as the signal 118, received from the external source. Thus the module 110 is preferably adapted to permit control of the structures and functions thereof from an external source rather than from the operator interface 114.

The folding module 110 (FIG. 2) includes sheet feeding structure 120, such as any conventional belt, roller or gripper-finger type structure, for engaging and feeding the respective sheets 14, including accumulations thereof, into the module 110. In addition, the module 110 includes one or more conventional sensing structures 122, which are operatively coupled to the control structure 112, for sensing the key code 19 printed on each sheet 12 or on a given sheet 12 of each accumulation thereof. Moreover, the module 110 includes conventional folding structure 124 for folding respective sheets 12 and accumulations thereof. Still further, the module 110 includes suitable feeding structure 128, such as a plurality of belts or rollers, or an arrangement of gripper fingers, for feeding the individual or accumulated folded sheets 12 one at a time from the module 110.

In addition, the module 110 (FIG. 2) includes a motor 130 and one or more drive system(s) 132 for the feeding structures 120 and 128. And the module 110 includes a plurality of conventional sensors 134 for sensing various positions of the sheets 12, and of elements of the motor 130 and drive systems 132, at respective time intervals, including their respective home positions. The sensors, 122 and 134, are preferably conventionally coupled to the control structure 112, whereby the control structure 112 may provide digital signals, such as the signal 136, to the external source, which correspond to the key code 19, to various positions of the respective sheets 12, and the elements of the motor 130 and drive system(s) 132. In addition, the feeding structure 128 may include conventional structure 138, such as a plurality of belts or rollers, or an arrangement of gripper fingers, for feeding individual and accumulated folded sheets 12 from the module 110.

The system of apparatus 20 (FIG. 2) additionally includes a sheet stacking module 140 for receiving the successive sheets from the bursting and trimming module 50, accumulations of sheets 12 from the accumulating module 80, or folded sheets 12, including folded accumulations thereof, from the folding module 110, as the case may be, sensing the key code 19 (FIG. 1a) printed thereon, or on a given sheet 12 thereof, and stacking the same.

The sheet stacking module 140 (FIG. 2), which is preferably a stand-alone device, includes suitable control structure 142, such as a microprocessor, for controlling the various structures and functions of the module 140, and may include a conventional operator interface 144, such as a keyboard which is conventionally coupled to the control structure 142 for operation thereof in response to input signals from the keyboard. Whether or not the module 140 includes an operator interface 144, the control structure 142 is preferably conventionally adapted to include a two-way serial or parallel communication link 146 for conventionally coupling the control structure 142 to an external source, such as the local computer hereinafter described, for operation of the control structure 142 in response to control signals, such as the signal 148, received from the external source. In addition, the control structure 142 preferably includes a conventional electrical connector 150 for removably electrically connecting an external memory, such as the memory hereinafter described, to the control structure 142. Thus the module 140 is preferably adapted to permit control of the structures and functions thereof from an external source rather than from the operator interface 144.

Figure 3:
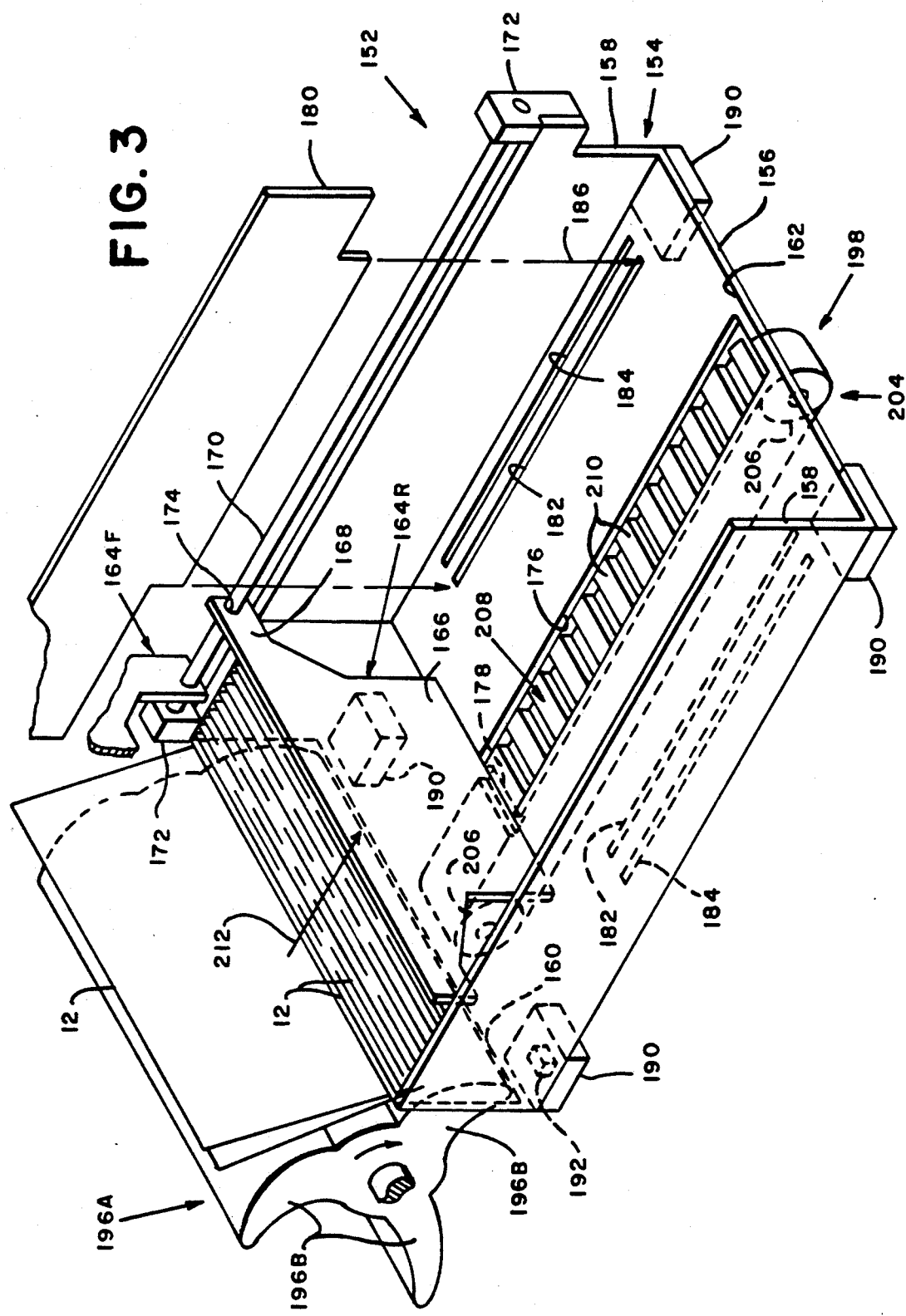
FIG. 3 is a partially schematic, perspective view of sheet supporting structure interfaced with structure for feeding sheets thereto.

The sheet stacking module 140 (FIG. 2) preferably includes portable sheet supporting structure 152 which is constructed and arranged to be removably connected to the sheet stacking module 140. The sheet supporting structure 152 (FIG. 3) comprises an open ended tray 154 including a base wall 156 and a pair of elongate, parallel-spaced, side walls 158. The side walls 158 extend upwardly from the base wall 156 and form therewith a front opening 160, for the entry of sheets 12 into the tray 154, and rear opening 162, for the exit of sheets 12 from the tray 154. In addition, the sheet supporting structure 152 includes at least one and preferably two opposed, movable, front and rear walls, 164F and 164R, one of which, i.e., the rear wall 164R, is fully shown. The rear wall 164R includes a rectangularly-shaped plate portion 166, which is shown located between the side walls 158, and an arm portion 168 which extends from the upper end of the plate portion 166 and into overhanging relationship with the upper edge of one of the side walls 158. For movably connecting the rear wall 164R to tray 154, the sheet supporting structure 152 includes an elongate slide bar 170 having its opposite ends suitably connected to the aforesaid one of the side walls 158, as by means a pair of supports 172 which are spaced apart from one another and fixedly connected to the aforesaid upper edge of one of the side walls 158. In addition, the rear wall's arm portion 168 is provided with an opening 174 formed therein which is dimensioned for receiving the slide bar 170 therethrough. And the arm portion 166 of the rear wall 164R is both pivotably and slidably mounted on the slide bar 170. As thus constructed and arranged, the rear wall 164R is pivotable about the slide bar 170 for moving the plate portion 166 into and out of its location as shown in FIG. 3, i.e., between the side walls 158. Moreover, the rear wall 164R is slidably movable along the slide bar 170, forwardly and rearwardly of the tray 154. Thus, assuming the provision of a single wall 164, for example the rear wall 164R, upon filling the tray 154 with sheets 12, the wall 164R would be disposed adjacent to the tray's rear opening 162. Thereafter, the rear wall 164R may be pivoted about the slide bar 170, and thus out of its location between the side walls 158, and slidably moved to the position occupied by the front wall 164F, i.e., adjacent to the tray's front opening 160, and again pivoted about the slide bar 170 for relocating the rectangularly-shaped plate portion 166 thereof between the side walls 158 for feeding sheets 12 through the tray's rear opening 162. For guiding movement of the rear wall 164R, the tray's base wall 156 has an elongate, slot 176 formed therein substantially midway between the side walls 158, and the rear wall's plate portion 166 include a depending finger portion 178 which is dimensioned to extend through the base wall slots 176 and into engagement with the belt hereinafter discussed. Inasmuch as the front and rear walls 164F and 164R are similarly constructed and arranged, the above discussion of the rear wall 164R applies with equal force to the front wall 164F.

To accommodate receiving sheets 12 (FIG. 3) of different sizes, the sheet supporting structure 152 may additionally include a pair of guide walls 180, one of which is shown. And, the tray's base wall 156 may be provided with one or more pairs of longitudinally extending, parallel-spaced, slots, 182 or 184, in which a pair of the guide walls 180 may be removably mounted in parallel-spaced relationship with one another between and parallel to the tray's side walls 158, as exemplified by the arrows 186 showing one of the guide walls 180 being removably mounted in one of the slots 182. In this connection it is noted that assuming the provision of one or both pairs of slots 182 or 184, the front and rear wall portions 166, one of which is shown, are preferably dimensioned to fit transversely between the closest pair of slots, 182 or 184. Still further, the sheet supporting structure 152 includes a plurality of legs 190, one of each of which is located at the one of four corners of the base wall 156. One of the legs 190, i.e., the lower left leg as shown in FIG. 3, acts as or is an electrical connector, dimensioned for engagement with the control structure's electrical connector 150 (FIG. 2), and includes or houses conventional electronic memory structure 192 (FIG. 3), including any commercially available EEROM, for storing data received from the control structure 142 (FIG. 2) including a list identifying each sheet 12 and an order in which the sheets 12 are stacked in the tray 154, such as the sequence of feeding sheets 12 (FIG. 3) into or from the tray 154.

The stacking module 140 (FIG. 2) additionally comprises conventional sheet feeding structure 196, such as a plurality of rollers or belts, or an arrangement of gripper fingers, for engaging sheets 12, as they are received the other module, 50, 80 or 110, as the case may be, and feeding the same into the stacking module 140. In addition, the feeding structure 196 preferably includes a rotatable member 196A including a plurality of vanes 196B extending radially therefrom for engaging and guiding the received sheets 12 one at a time, to and through the front opening 160 of the tray 154. Thus, as shown in FIG. 3, the front wall 164F of the sheet receiving structure 152 is pivotably moved out of from between the side walls 158. For incrementally rearwardly moving the rear walls 164R of the tray 154 in synchronism with the sheets 12 being fed through the tray's front opening 160, the module 140 preferably includes wall moving structure 198. The wall moving structure 198 comprises a belt system 204 including a pair of parallel-spaced pulley gear 206, and a gear belt 208 which is looped about the rollers 206 and disposed in meshing engagement therewith. Preferably, the outer surface of the gear belt 208 includes a plurality of gear teeth 210 which are formed in the belt 208, at equal intervals longitudinally of the length of the belt 208 for receiving therein the tray's respective front or rear wall finger portions 178. As shown in FIG. 3, the rear wall finger portion 178 extends downwardly through the tray's base wall slots 176 and into engagement with one of the gear teeth 210 of the belt 208, when the sheet receiving structure 152 is connected to the module 140, to permit the finger portion 178, and thus the tray's rear wall 164R, to be engaged and moved by the belt 208 in a path of travel 212 which extends lengthwise of the tray 154. According, the sheet and wall feeding structures, 196 and 198 (FIG. 2), and the sheet supporting structure 152, are respectively constructed and arranged for both physical and operational engagement and disengagement with one another, to permit the sheet supporting structure 152 to be both mechanically and electrically connected to, and disconnected from, the stacking module 140.

Still further, the module 140 (FIG. 2) may include one or more conventional sensing structures 214 which are operatively coupled to the control structure 142 for sensing the key code 19 (FIG. 1a) printed on respective sheets 12. Moreover, the module 140 (FIG. 2) includes a motor 216 and one or more drive systems 218 for the feeding structures 196 and 198. And the module 140 includes a plurality of conventional sensors 220 for conventionally sensing various positions of elements of the motor 216 and drive units 218, including their respective home positions, at various time intervals. The sensors 214 and 220 are preferably conventionally coupled to the control structure 142, whereby the control structure 142 may provide digital signals, such as the signal 221, to the external source which correspond to the key codes 19 (FIG. 1) printed on the sheets 12, to various positions of respective sheets 12 (FIG. 2), and the various positions at respective time intervals of selected elements of the motor 216 and drive system(s) 218.

Notwithstanding the foregoing discussion, in an alternate embodiment of the invention, the stacking module 140 may include conventional sheet supporting structure fixedly attached to the module 140 so as to form a component part thereof, rather than including the removably connectable sheet supporting structure 152, in which instance, the module 140 is then conventionally constructed and arranged to removably received an electronic data storage device 192, such as a chip, card, disc or other device equipped with an EEROM for storing data therein which identifies each sheet 12 in a stack 38 with which it is associated and the order in which such sheets 12 are stacked in the conventional sheet supporting structure. Whereupon a given stack 38 of associated sheets 12 which are stacked by the stacking module 140 may be manually transported to another sheet processing structure such as inserter apparatus or the assembling module described herein, together with the removably connected data storage device 192. And, the contents of the removably memory structure 192 may then be downloaded to a conventional controller of the inserting apparatus, or to the local computer herein described in the case of an assembling module.

Figure 4:
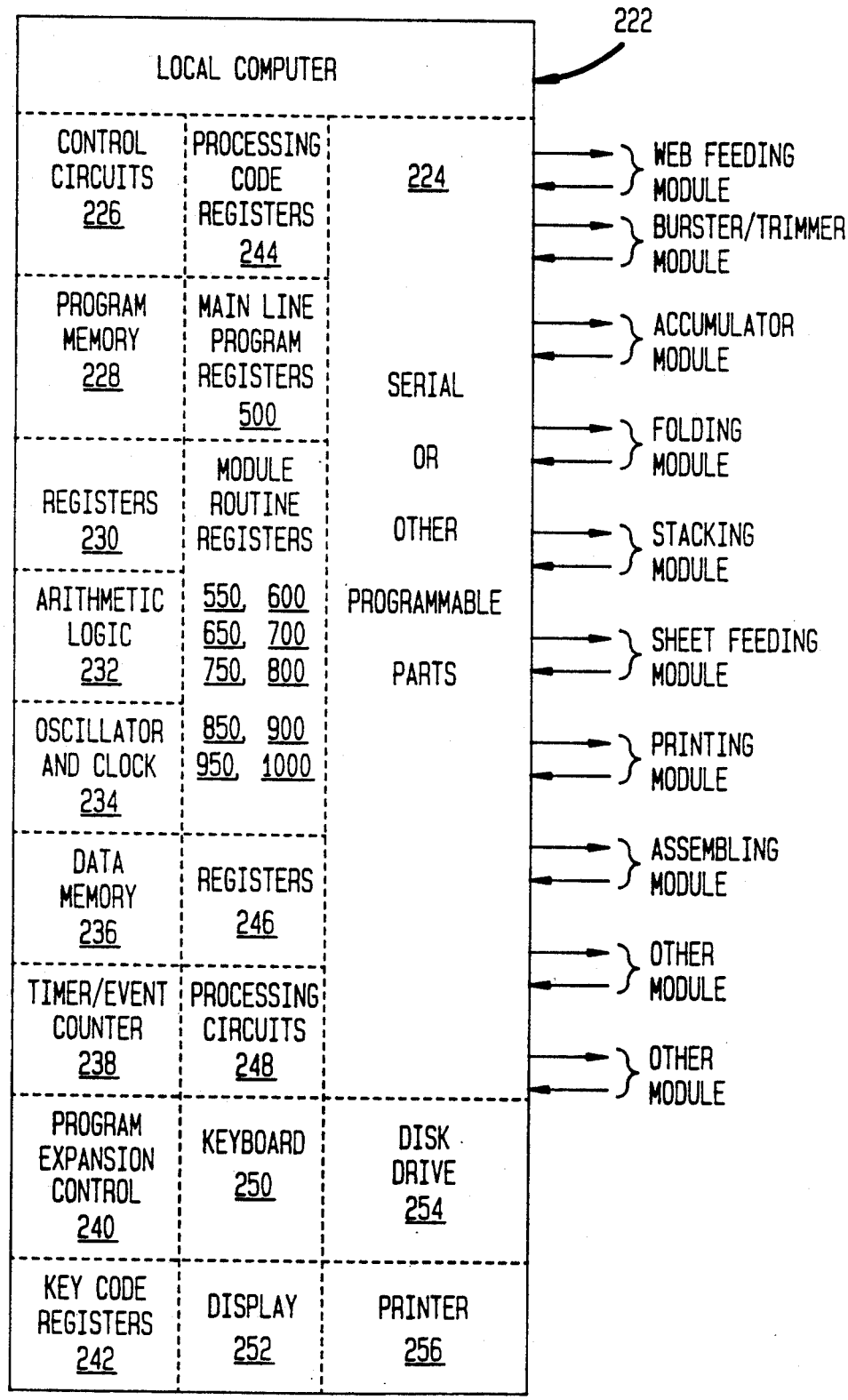
FIG. 4 is a block diagram of a local computer for controlling the systems of apparatus shown in FIGS. 2 and 5.

The system of apparatus 20 (FIG. 2) additionally includes an external source, such as the local computer 222 shown in FIG. 4, for controlling the structures and functions of the various systems of apparatus 20 herein described.

To that end, the local computer 222 (FIG. 4) may be any commercially available computer having a sufficient number of communication ports 224 which are programmable for serial or parallel communications, as the case may be, to provide a separate two-way serial or parallel communications link for each of the apparatus modules hereinbefore and hereinafter discussed. In addition, the local computer 222 generally includes a plurality of discrete circuits including those for a plurality of central processing units, each of which includes control circuits 226, a program memory 228, a plurality of registers 230, an arithmetic logic unit 232, and circuits for one or more oscillators and clocks 234, data memories 236, timers and event counters 238 and program expansion control 240. In addition, the local computer 222 includes additional registers 242 for storing listings of key codes 19, each of which preferably uniquely identifies a specific sheet 12. Further, the local computer 222 includes additional registers 244 for storing a plurality of processing codes 18 each of which includes a different one of the key codes 19. The local computer 222 also includes a plurality of registers circuits for storing a main line program 500 a plurality of module routines 550, 600, 650, 700, 750, 800, 850, 900, 950 and 1000, i.e., one for each of the apparatus modules hereinbefore and hereinafter described. In addition, the local computer 222 includes a plurality of registers 246 for future use or for use as working registers and other permanent or temporary data storage purposes. In addition, the local computer 222 includes a conventional local terminal which is conventionally operably interconnected to the remainder of the local computer 222. The terminal generally includes a plurality of processing circuits 248 which are conventionally interconnected to a keyboard 250, display 252, disk drive 254 and printer 256. And the local terminal is conventionally constructed and arranged to permit programming the same from a conventional disc inserted into the disk drive 254. Further the local terminal is conventionally programmed to permit the call-up and print-out, at the printer 256, in response to operator input from the keyboard 248, of the whole or any part of any information concerning the operation of any apparatus module or one or more of or any list of key codes 18 or processing codes 19, and any or all corresponding information embodied in such codes 18 or 19, or both.

The system of apparatus 20 (FIG. 2) may alternatively include, instead of the web feeding module 22 and bursting and trimming module 50, a sheet feeding module 260 (FIG. 5), either alone or in combination with a printing module 290.

The sheet feeding module 260 (FIG. 5), which is preferably a conventional, stand-alone device, includes suitable control structure 262, such as a microprocessor, for controlling the various structures and functions of the module 260. In addition, the module 260 may include a conventional operator interface 264, such as a keyboard which is conventionally coupled to the control structure 262 for operation thereof in response to input signals from the keyboard. Whether or not the module 260 includes the operator interface 264, the control structure 262 is preferably conventionally adapted to include a two-way serial or parallel communication link 266 for conventionally coupling the control structure 262 to an external source, such as the local computer 222 hereinbefore described, for operation of the module 260 in response to control signals, such as the signal 268, received from the external source. Thus the module 260 is preferably adapted to permit control of the structures and functions thereof from an external source rather than from an operator interface 264.

The sheet feeding module 260 (FIG. 5) additionally includes conventional input stacking structure 270, such as a suitable bin, into which a stack 272 of sheets 12 may be loaded. In addition, the module 260 includes conventional feeding structure 274. The feeding structure 274 may be any conventional roller or vacuum type structure for engaging and feeding sheets 12 from the top or bottom of the stack 272. Further, the sheet feeding module 260 includes a motor 276 and one or more drive system(s) 278 for the feeding structure 274. The sheet feeding module 260 may also include one or more conventional sensing structures 280 for sensing processing and key codes, 18 and 19, printed on the respective sheets 12, and a plurality of conventional sensors 282 (FIG. 5) for sensing various positions of respective sheets 12, and of selected elements of the motor 276 and drive system(s) 278, including their respective home positions, at selected time intervals. The sensors 280 and 282 are preferably conventionally coupled to the control structure 262, whereby the control structure 262 may provide digital signals, such as the signal 284, to the external source which correspond to the processing and key code, 18 and 19, to various positions of the sheets 12, and to elements of the motor 276 and the drive system(s) 278 at selected time intervals. In addition, the feeding structure 274 may include conventional means such as a roller 286 for feeding the respective sheets 12 from the sheet feeding module 260.

Figure 5:
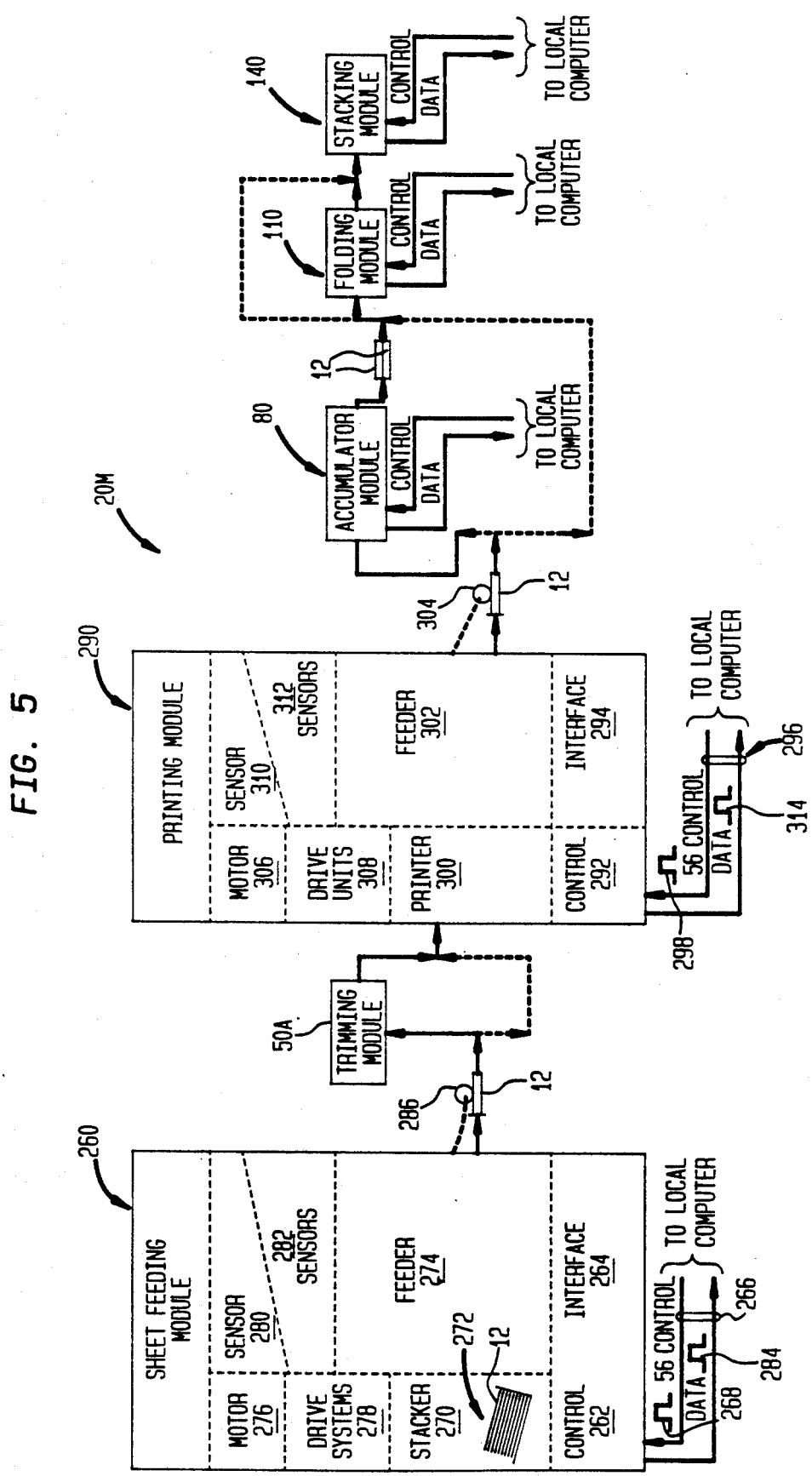
FIG. 5 is a block diagram, similar to FIG. 2, of various additional sheet processing systems of apparatus according to the invention.

As shown in FIG. 5, the sheets 12 fed from the sheet feeding module may be fed directly to the stacking module 140 or indirectly thereto via either or both of the an accumulating module 80 and folding module 110. Moreover, before being fed directly or indirectly as aforesaid to the stacking module 140, in the case of sheet 12 such as that shown in FIG. 1d, having a marginal edge 17, the sheet 12 (FIG. 5) may be feed to a trimming module 50A which is in all respects the same as the bursting and trimming module 50 shown in the FIG. 2 except that it does not includes the bursting structure 66 or any drive systems 72 therefore. Further, and also alternatively, before being fed directly or indirectly to the aforesaid stacking module 140, it may be desirable to print additional information, such as an address, serial number, permit mail number or postal zip code or bar code, or other information on the sheet 12. This being the case, the sheets 12 from the sheet feeding module 260 or trimming module 50A may be processed by the printing module 290 before further processing.

The printing module 290 (FIG. 5), which is preferably a conventional, stand-alone device, includes suitable control structure 292, such as a microprocessor, for controlling the various structures and functions of the module 290. In addition, the module 290 may include a conventional operator interface 294, such as a keyboard which is conventionally coupled to the control structure 292 for operation thereof in response to input signals from the keyboard. Whether or not the module, 290 includes the operator interface 294 the control structure 292 is preferably conventionally adapted to include a two-way serial or parallel communication link 296 for conventionally coupling the control structure 292 to an external source, such as the local computer hereinbefore described, for operation of the module 290 in response to control signals, such as the signal 298, received from the external source. Thus the module 290 is preferably adapted to permit control of the structures and functions thereof from an external source rather that from an operator interface 292.

The printing module 290 (FIG. 5) additionally includes conventional printing structure 300, such as any conventional impact, rotary, thermal, ink jet, laser or other commercially available printing apparatus, to which the sheets 12 are fed. In addition, the module 290 includes conventional feeding structure 302. The feeding structure 302 may be any conventional vacuum-type or roller-type structure for engaging and feeding the sheets 12, including a roller 304 for feeding sheets 12 from the module 290. Further, the printing module 290 includes a motor 306 and one or more drive system(s) 308 for the feeding structure 302. The printing module 290 may also include one or more conventional sensing structures 310 for sensing the processing and key codes, 18 and 19, (FIGS. 1b, 1e, 1d or 1e) and a plurality of conventional sensors 312 (FIG. 5) for sensing various positions of respective sheets 12, and of selected elements of the motor 306 and drive system(s) 308, including their respective home positions, at selected time intervals. The sensors 310 and 312 are preferably conventionally coupled to the control structure 292, whereby the control structure 292 may provide digital signals, such as the signal 314, to the external source which correspond to processing and key codes 18 and 19, to various positions of the sheets 12, and to the various positions of at respective time intervals of elements of the motor 306 and drive system(s) units 308.

Figure 6:
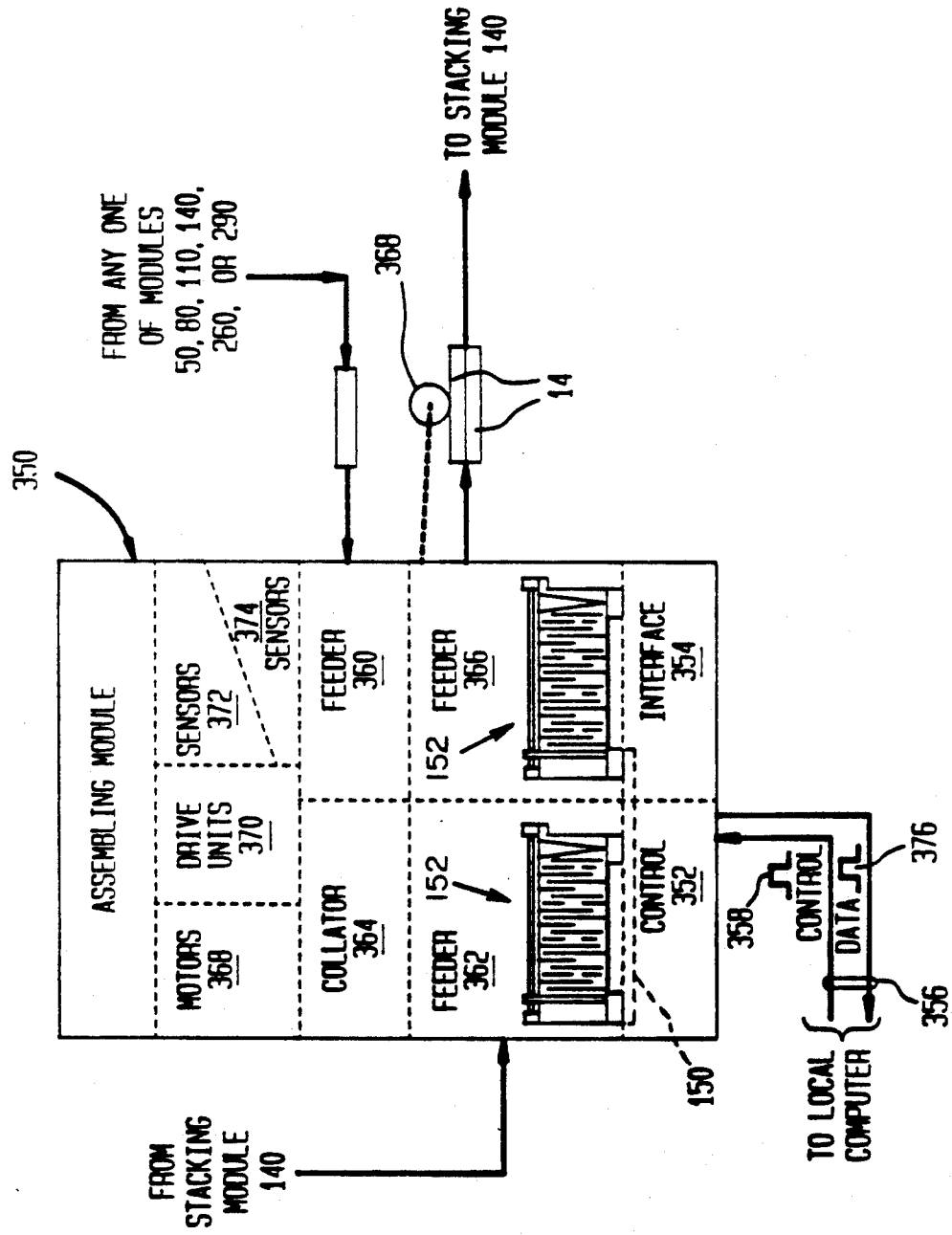
FIG. 6 is a block diagram of a sheet assembling module according to the invention.

As shown in FIG. 6, the systems of apparatus shown in FIGS. 2 and 5 may be modified to permit matching coded sheets 12 (FIG. 4) with one another from separate stacks of sheets 12 which are fed from separate sheet supporting structures 152 (FIG. 6) or, alternatively, sheets 12 fed from separate bursting and trimming modules 50 (FIG. 2), accumulating modules 80, folding modules 110, sheet feeding modules 260 (FIG. 5), trimming modules 50A or printing modules 290, or fed from two of any of the modules, 50, 50A, 80, 110, 140 or 260 (FIGS. 2 and 5) or the sheet supporting structure 152 (FIG. 3), through the use of a sheet assembling module 350 (FIG. 6)

The sheet assembling module 350 (FIG. 6), which is preferably a conventional, stand-alone device includes suitable control structure 352, such as a microprocessor, for controlling the various structures and functions of the module 350. The control structure 352 preferably includes one or more connectors 150 as hereinbefore described in connection with the discussion of FIG. 3, for electrically interfacing one or more memory structure(s) 192 (FIG. 7) of respective sheet supporting structures 152 to the control structure 352 (FIG. 6). In addition, the module 350 may include a conventional operator interface 354 such as a keyboard which is conventionally coupled to the control structure 352 for operation thereof in response to input signals from the keyboard. Whether or not the module 350 includes the operator interface 354 the control structure 352 is preferably conventionally adapted to include a two-way serial or parallel communication link 356 for conventionally coupling the control structure 352 to an external source, such as the local computer 222 hereinbefore described, for operation of the module 350 in response to control signals, such as the signal 350, received from the external source. Thus the module 350 is preferably adapted to permit control of the structures and functions thereof from an external source rather that from an operator interface 354.

The sheet assembling module 350 (FIG. 6) may additionally comprises conventional feeding structures 360 including any suitable vacuum-type, roller-type, or gripper finger-type structures including, for example, a feed roller 363 (FIG. 3) for receiving, and engaging and feeding the sheets 12 received directly from one or more of the aforesaid modules 50, 80, 110, 140 or (FIGS. 2 and 5).

Moreover, in the alternate embodiment of the invention hereinbefore discussed, the feeding structure 360 may be conventional feeding structure which is manually loaded with a stack 38 of sheets 12 that have been manually transported to the sheet assembling module 350 and conventionally stacked in the module 350 for feeding by the feeding structure 360. In which instance the module 356, and preferably the feeding structure 360. In which instance the module 356, and preferably the feeding structure 360 thereof, includes conventional structure for reasonably connecting thereto the electronic data storage device 192 hereinbefore discussed. And, the local computer would be conventionally programmed for downloading the contents of the storage device 192 to the control structure 352 or to local computer 222, or both, for utilization thereby in the course of processing the sheets 12 of the stack 38.

Figure 7:
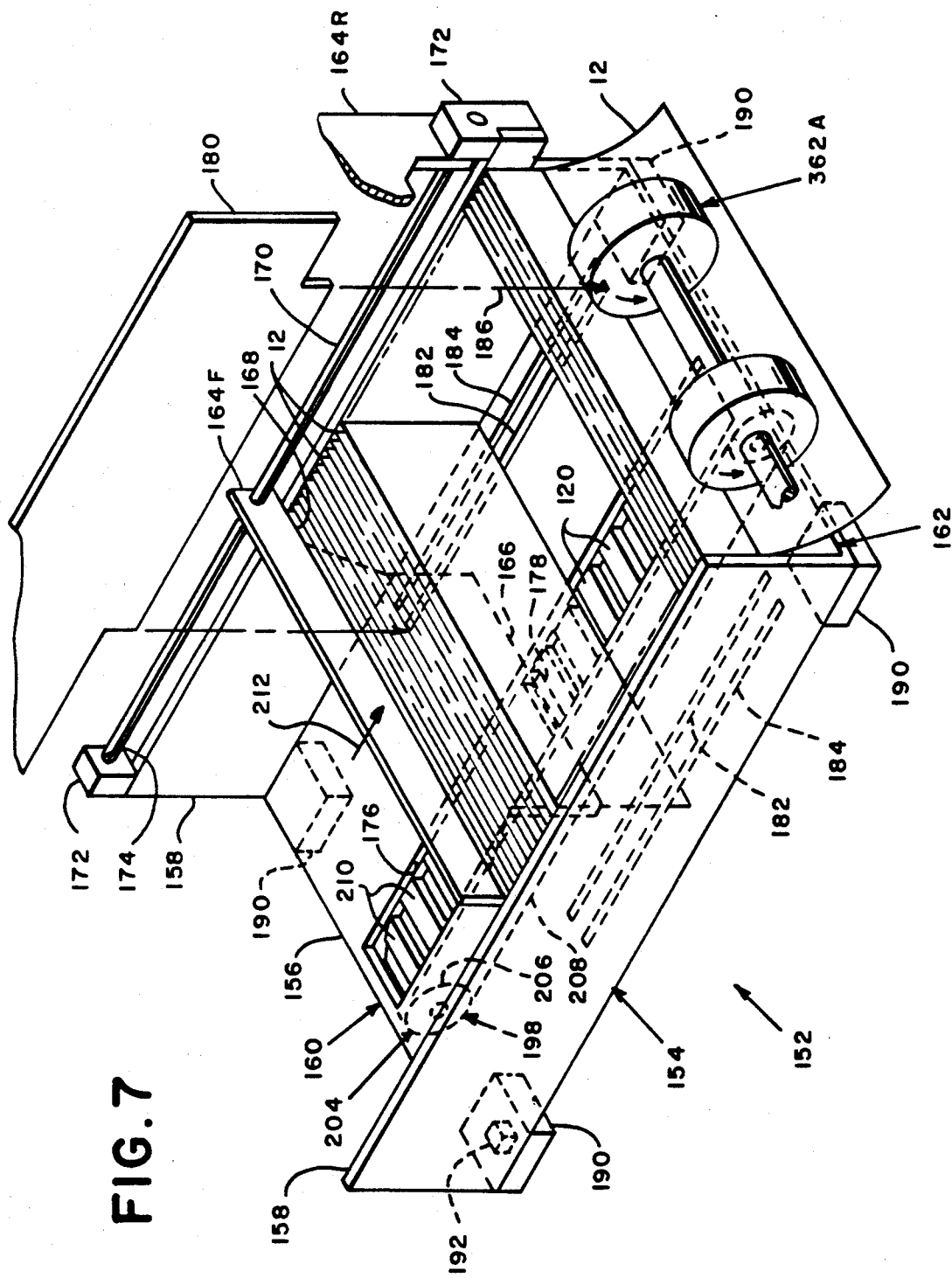
FIG. 7 is a partially schematic, perspective view, similar to FIG. 3, of sheet supporting structure interfaced with structure for feeding sheets therefrom.

Thus the feeder 360 need not be constructed and arranged for removably connecting thereto the sheet supporting structure 152 FIG. 3). On the other hand, the assembling module 350 preferably includes feeding structure 362 which is constructed and arranged for receiving, and removably interfacing therewith, respective sheet supporting structures 152 which are transported to the assembling module 350 after being filled with a stack 38 of sheets 10 at the stacking module 140 (FIGS. 2 or 5). Moreover, the feeding structure 362 is conventionally constructed and arranged to include any conventional belt gripper finger or roller structure, including, for example a roller 362A, for feeding the respective sheets 10, one at a time from the stack 38. Further, without departing from the spirit and scope of the invention the feeding structure 360 may also be constructed and arranged, similarly to the feeding structure 362, to permit the assembling module 350 to process sheets 10 stacked in two different sheet supporting structures 152. Accordingly, either or both of the feeding structures 360 and 362 are preferably constructed and arranged for removably receiving sheet supporting structures 152 which has been transported thereto from the stacking module 140 after having been filled with a stack 38 of sheets 12. Accordingly, each of the feeding structures 360 and 362 preferably includes a belt a systems 204 (FIG. 7), as hereinbefore described in connection with the discussion of FIG. 3, including a pair of pulley gears 206 (FIG. 7) having a belt 208 looped thereabout which includes a plurality of gear teeth 210 formed therein for engaging the finger member 178 of one of the movable walls 164F or 164R of a tray 154 for example the wall 164F as shown in FIG. 7, for incrementing the same in timed relationship with feeding sheets 12 from the tray 154 as be means of conventional roller structure 362A. In connection with the foregoing discussion it is noted that in a preferred embodiment of the sheet supporting structure 152 shown in both FIGS. 3 and 7, includes two movable walls 164F and 164R. And, as thus constructed and arranged, when the structure 152 is manually transported from the stacking module 140 to the assembling module 350, both of the walls 164F and 164R are normally disposed between the side walls 158 to facilitate holding stack the sheet 112 of a stack 38 in place in the tray 154 in the course of transporting the same. Further the sheet assembling module 350 (FIG. 7) includes conventional sheet assembling structure 364 for collating sheets 12 fed thereto from the feeding structures 360 and 362. The assembling structure 364 may be any conventional pusher-type, vacuum-type or belt-type structure, or a combination thereof. And, the sheet assembling module 350 includes conventional feeding structure 366, which may be any conventional belt-type, roller-type or gripper finger-type structure, including for example a roller 368, for successively feeding respective collations of sheets 12 from the collating structure 364, and, preferably, to a stacking modules 140, 368.

The sheet assembling module 350 (FIG. 6) also includes one or more motors 368, and a plurality of drive units 370 for the feeding structures 360, 362 and 366. In this connection it is noted that one or more of its drive system(s) 370 (FIG. 7) may be connected between the motor(s) 368 and belt system(s) 204 for driving the belt system 204. The sheet assembling module 310 also includes a plurality of conventional sensing structures 372 for sensing the processing and key codes, 18 and 19, (FIGS. 1b, 1c or 1d), and a plurality of conventional sensors 374 (FIG. 6) for sensing various positions of respective sheets 12, and respective positions of selected elements of the motors 368 and drive units 370, including their respective home positions, at selected time intervals. The sensors 372 and 374 are preferably conventionally coupled to the control structure 352, whereby the control structure 352 may provide digital signals, such as the signal 376, to an external source such as the local computer 222 hereinbefore described, which correspond to either or both of the processing and key codes 18 and 19, lists of codes stored in the memory structures 192 (FIG. 7) of sheet supporting structures 152 and, as hereinbefore described, which correspond to various positions of the sheets 12, and to various positions of elements of the motor 306 and drive system(s) 370. In addition, the output feeding structure 366 may include conventional structure, such as a roller 368, for feeding the respective collations of sheets 12 from the sheet assembling module 350 to the stacking module 140 (FIGS. 2 or 5).

Figure 9A:
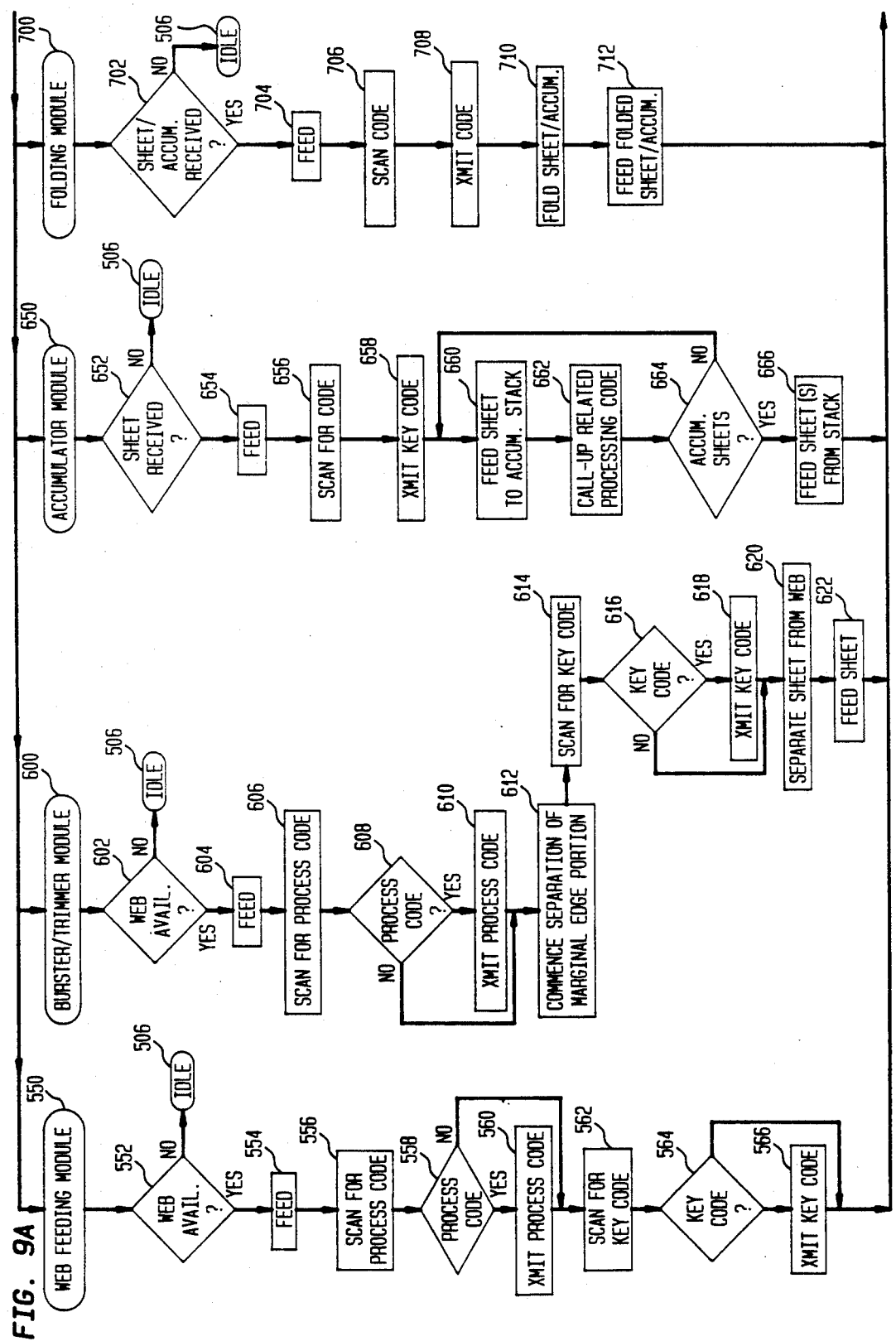

In general, the local computer 222 (FIG. 4) includes two types of software programs, i.e., a main line program 500 (FIG. 8) and a plurality of command execution routines (FIGS. 9a and 9b).

The local computer's main line program 500 (FIG. 8) commences with the step 502 of conventionally initializing the local computer 222 (FIG. 4), which generally includes establishing the initial voltage levels at the computer ports utilized for the control and data communications lines of the apparatus modules, and setting the timers and event counters. Thereafter the main line program 500 (FIG. 8) communicates with the respective apparatus modules and causes their respective motors and drive units to be conventionally initialized, step 504. Step 504 entails causing the control structure microprocessors of the various modules to scan the various microprocessor ports associated with the drive units and sensors of the modules for determining whether or not the sensed elements of the motors and drive units, such as their respective output elements, are properly located for initiating operation of the various components of the modules and, if not, the program 500 causes the motors and drive units to be driven to urge their respective elements, and thus the motors and drive units, to their respective home positions.

Assuming the initialization steps 502 (FIG. 8) and 504 are completed, the program 500 enters an idle loop routine, step 506. In the idle loop routine, step 506 a determination is initially made as to whether or not a request or command has been received, step 508. Assuming a request or command has not been received, step 508, processing is returned to idle 506. When a request or command, step 508, is received, a determination is made as to whether or not the request or command, is an interrupt from the terminal of the local computer, step 510. Assuming the request or command is an interrupt from the local terminal, step 510, then, the program 500 causes the request or command to be immediately executed, for example by causing a change to be implemented in a code or list thereof, or in operation of one of the apparatus modules, or in other control information. Assuming, however that the request or command is not an interrupt from the local terminal, step 510, then the program executes the step 514 of determining whether or not the request or command is a non-interrupt request or command from the local terminal. Assuming that it is, step 514, then the program implements the step 516 of executing the request or command, for example, for causing a message, such as a message indicating that a given sheet supporting structure 152 is filled with sheets 12, to be displayed or printed, or causing a key code, or processing code and related information, to be fetched and displayed or printed. Thereafter the program implements the step 518 of determining whether or not a program change is to be implemented, and, assuming that no such change is to be implemented, based upon operator input, processing is returned to idle, step 506. Assuming, however that, based upon operator input, a change is to be made in the programming, then the change is formulated as an interrupt request or command and the program causes processing is to be transferred to step 508. Whereupon the request or command is processed immediately, i.e., out of turn with all other unexecuted requests or commands. Accordingly, if a displayed or printed message calls for the operator to act in response to it, without changing programming, then, the operator would respond. On the other hand, if such a change is to be made, step 518, then, in response to operator input from the local terminal, or prior programming, the program 500 causes processing to be immediately implemented for example, to change the operation of a given apparatus module in response to sensing a processing or key code, or to change the order of codes of a given listing of key codes or processing codes. Returning to step 514, if a determination is made that the request or command, step 508 is not from the local terminal, then, the program implements the step, 522, of determining whether or not the request or command is for the local terminal, and, assuming that it is, the program implements the step, 524, of displaying or printing the message, followed by returning processing to idle, step 506. If however, the request or command is not for the local terminal, step 522, then it is necessarily from one of the apparatus modules, is concerned with the operation thereof and is for execution under the control of the local computer. Accordingly, the program 500 causes the request or command to be executed, step 526, by calling up the appropriate apparatus module routine 550 (FIG. 9a), 600, 650, 700, 750 (FIG. 9b) 800, 850, or 900, as the case may be.

As shown in FIG. 8 requests and commands from the various apparatus modules that are for the modules and not directed to use of the local terminal, step 526, are normally handled by the local computer on a firstcome, first-serve basis, whereas requests or commands from the keyboard may, at the option of the operator, be handled on an interrupt basis. Moreover, it is within the scope of the invention to handle specific requests or commands from the modules which are concerned with the operation thereof on an interrupt basis, for example, a module shut down message. In any event, in the preferred embodiment, the local computer 222 (FIG. 4) has the capacity to handle parallel processing of requests and commands from and for the apparatus modules, as a result of which the local computer response time for execution of any given request or command does not in any event have an effect upon the timeliness of the sheet processing functions of the respective modules.

Assuming that the web feeding module routine 550 (FIG. 9a) is called up, a determination is initially made, step 552, as to whether or not a web is available for feeding. Assuming that a web is not available, processing is returned to idle, step 506, until such time as a web is available so as to permit the program to execute the next request or command. Assuming that a sheet is available, step 552, the routine causes the sheet to be fed by the module's feeding structure step 554. As the web is being fed, the processing code 18 (FIG. 1a) on a marginal edge portion 17 the web 10 is caused to be scanned by the module's code sensor, step 556, followed by the step 558 of inquiring whether or not a processing code has been sensed. Assuming a processing code is sensed within a predetermined time interval, step 558, the routine executes the step 560 of transmitting the code to the local computer, followed by executing the step 562 of causing the feeding module's sensors to scan the sheet for a key code. If however, the processing code is not sensed before the lapse of the predetermined time interval, step 558, then, the routine bypasses step 560 and causes key code scanning to commence, step 562. Thereafter, the routine executes the step 564 of determining whether or not a key code has been sensed. Assuming a key code is sensed within a predetermined time interval, step 564, the routine executes the step of causing the key code to be transmitted to the local computer, step 566, followed by the successive steps of transmitting a message to the local computer step 568 (FIG. 9b) which indicates that the command has been executed and returning processing to idle 506. If however, before the lapse of the predetermined time interval the key code is not sensed, step 564 (FIG. 9a) then, the routine bypasses step 566, and, as hereinbefore described, executes the successive steps 568 (FIG. 9b) and 506 of transmitting a command executed message to the local computer and returning processing to idle.

Assuming the request or command 522 (FIG. 9b) is to be executed by the bursting and trimming module, the bursting and trimming module routine is called up, step 600 (FIG. 9a), and processing is initiated by the routine making a determination as to whether or not a web has been received from the web feeding module, step 602. If a web has not been received, the routine causes processing to be returned to idle 506, to permit execution of other requests or commands. When a web is available step 602, the routine executes the step 604 of causing the web to be fed into the module. As the web is being fed, the routine executes the step 606 of causing a sensor of the module to scan the marginal edge of the web for a processing code. The routine then causes a determination to be made as to whether or not a processing code been found, step 608. And, assuming that a processing code is found within a predetermined time period, the routine then causes the processing code to be transmitted to the local computer, step 610, followed by the step of causing the bursting and trimming module's edge-separation structure to commence separating the marginal edge portion of the web which includes the transmitted processing code, step 612. Assuming however, with reference to step 608, that a processing code is not sensed within the predetermined time period, then, the routine bypasses step 610 and executes the step 612 of commencing separating the marginal edge portion of the web. At any time after step 612 is commenced, the routine executes the step 614 of causing the sensing structure of the module to scan the sheet which is bordered by that marginal edge portion for a key code, followed by implementation of the step 616 of determining whether or not a key code has been found. Assuming the inquiry of step 616 is positive, that is, within a predetermined time interval a key code is sensed, then the routine executes the step 618 of causing the sensed key code to by transmitted to the local computer, followed by the step 620 of causing the sheet separating structure of the bursting and trimming module to separate the sheet, having the sensed code, from the web. If however, with reference to step 616, upon lapse of the aforesaid predetermined time interval a key code has not been sensed, step 616, then, step 618 is bypassed and the routine implements the step 620 of causing that sheet to be separated from the web. After the sheet separation step 620, or concurrently therewith, assuming the provision of a bursting roller which act as a feed roller, the routine causes the module to execute the step 622 of busting and feeding or simply feeding the separated sheet to the next sheet processing module, followed by the successive steps 568 (FIG. 9b) and 506 of transmitting a command execution complete message and returning processing to idle.

Assuming that the next apparatus module included in the system of apparatus 20 (FIG. 2) is a sheet accumulating module 80, then, the routine calls up the accumulating module routine 650 (FIG. 9a). Whereupon the routine 650 initially executes of the step 652 of determining whether or not a sheet is available, and, if it is not, returns processing to idle, 506, to permit the program to implement execution of other requests and commands. Assuming a sheet is received, step 652, the routine implements the step 654 of causing the module to feed the sheet into the module. As the sheet is being fed, the routine causes the module's sensing structure to scan the sheet for a key code, step 656, which is, for the purposes of this discussion assumed to be printed on the sheet. Accordingly, the routine then executes the step 658 of causing the key code to be transmitted to the local computer, step 658, followed by the successive steps of causing the module's feeding structure to feed the sheet to the accumulating stack, step 660, causing call-up of the processing code that is related to the transmitted key code, step 662, and making a determination as to whether or not, from the informational data embodied in the processing code, the next sheet fed to the accumulating stack is to be collated with the sheet in the stack, step 664. Assuming a determination is made that the next sheet fed to the module is not to be collated with the sheet in the accumulating stack, step 664, then, the routine causes the module's a feeding structure to feed the contents of the accumulating stack from the module, step 666. If however, with references to step 664 a determination is made with respect to a given sheet that it is to be collated with a next sheet, then the routine loops to step 660, with the result that step 666 is not executed. Steps 660, 662 and 664 are implemented successively for each sheet until a determination made, step 664, that a given sheet fed to the stack, step 660, is not waiting for collation with next successive sheet. Whereupon the routine causes the module, as hereinbefore discussed, to execute the step 666 of feeding the sheet(s) from the accumulating stack. Subsequent to execution of step 666, the routine executes the successive steps 658 (FIG. 9b) and 506 of transmitting a command execution complete message to the local computer and returning processing to idle.

Assuming the next system apparatus module to which sheet(s) from the accumulating module 80 (FIG. 2), or bursting and trimming module 50, are fed is the folding module 110, then, the program calls up the folding module routine, step 700 (FIG. 9a). Whereupon the routine 700 initially executes the step 702 of determining whether or not a sheet, or accumulation of sheets, has been received. Assuming a sheet or accumulation thereof has not been received, processing is returned to idle 506. If however, a sheet or accumulation has been received, the routine initially executes the step 704 of causing the module's feeding structure of feed the sheet or accumulation into the module, followed by causing the module's sensing structure to scan the sheet, or, in the case of an accumulation, one of the sheets, for a key code, step 706. Since, for the purpose of this discussion it is assumed that a key code is printed on such sheets, the routine then executes the step 708 of causing the key code to be transmitted to the local computer, followed by the step 710 of causing the modules folding structures to fold the sheet or accumulation. Thereafter, the routine executes the step 712 of causing the module's feeding structure to feed the folded sheet or folded accumulation from the module, followed by the successive steps 568 (FIG. 9b) and 506 of causing a command executed message to be transmitted to the local computer and returning processing to idle.

Assuming that the next apparatus module to which a sheet is fed from the bursting and trimming module 50 (FIG. 2), or to which a sheet or accumulation is fed from the accumulating module 80, or to which a folded sheet or folded accumulation is fed from the folding module 110, is the stacking module then, the program executes the step 850 (FIG. 9b) of calling up the stacking module routine 850. Whereupon the routine 850 initially executes the step 852 of determining whether or not the sheet, or accumulation, folded or unfolded, has been received. Assuming that it has not, step 852, processing is returned to idle 506. If however, the inquiry of step 852 is affirmative, then the routine executes the step 854 of causing the module's feeding structure to feed the sheet or accumulation, folded or unfolded, into the module. As the sheet(s), folded or unfolded, are fed, the routine executes the step 856 of causing the module's sensing structure to scan for a key code. And, since it is assumed in this discussion that the key code is printed on the scanned sheet, the routine then executes the successive steps of transmitting the key code to the local computer, step 858. Thereafter the routine executes the step 860 of determining whether or not the sensed key code or its related processing is to be stored in the memory 192 (FIG. 3) of the removable sheet supporting structure 152. Assuming the related processing code rather than the sensed key code is to be stored, then, the routine executes the step 862 (FIG. 9b) of calling up the related processing code, followed by the successive steps of storing the processing code in the memory of the sheet supporting structures, step 864, and feeding the sheet bearing the related key code to the sheet supporting structure for stacking therein, step 866. If however, with reference to step 860, a determination is made that the sensed key code, rather than the related processing code, is to be stored in the memory of the sheet supporting structure, then, the routine executes the step 868 of causing the key code to be stored in the memory, followed by the aforesaid step 866 of feed causing the module to the sheet bearing the key code to the stack in sheet supporting structure. Thereafter, the routine executes the step 870 of causing the module to increment the movable wall of the sheet supporting tray in synchronism with the sheet being fed to the stack, followed by the step 872 of making a determination as to whether or not the sheet supporting tray is full. Assuming that it is not, the routine executes the successive steps of transmitting an appropriate command execution complete message to the local computer step 568, and returning processing to idle 506. If however, a determination is made that the sheet supporting tray is full, step 872, then, the routine causes an appropriate message to that effect to be transmitted to the local computer terminal, followed by the step 876 of causing a conventional shut down routine to be implemented, and then returning processing to idle, step 506.

Assuming that the system 20 (FIG. 2) of apparatus modules 22, 50, 80, 110 and 140 is modified to replaces the web feeding and bursting and trimming modules 22 and 50, with a sheet feeding module 260 (FIG. 5) alone or in combination with a printing module 290, then the modified systems 20M of apparatus module 260, 290, 80, 110 and 140 would be provided.

Assuming the provision of a sheet feeding module 260 (FIG. 3), the local computer 222 (FIG. 4) is preferably connected in communication with the module 260 (FIG. 3) as hereinbefore discussed and the local computer 222 (FIG. 4) includes the software routine 750 for operation of the sheet feeding module.

Assuming the provision of a request or command 522 (FIG. 9b) for the sheet feeding routine 750, the routine 750 is called up and initially executes the step 752 of determining whether or not a sheet is available. It it is not, the routine returns processing to idle 506 until a sheet is available, step 752. Whereupon the routine executes the step 754 of causing the feeding structure of sheet feeding module to feed the sheet into the module. As the sheet is being fed, the routine causes sensing structure of the sheet feeding module to scan the sheet for a code, step 756, followed by the step 758 of causing the code to be transmitted to the local computer, and then causing the sheet to be fed to the next sheet processing module, followed by the successive steps 568 and 506 of transmitting command executed message to the local computer and returning processing to idle.

Assuming the next sheet processing module is a printing module 290 (FIG. 5), and a request or command is directed to the software routine 800 (FIG. 4) of that module, then the printing module routine 800 (FIG. 9b) would be called up. Whereupon the routine 800 executes the initial step 802 of determining whether or not a sheet is available. Assuming that it is not, the routine returns processing to idle 506 until a sheet is available, step 802. If however, a determination is made that a sheet is available, then the routine executes the step 804 of causing feeding structure of the module to feed the sheet into the module. As the sheet is being fed, the routine executes the step of causing sensing structure of the module to scan the sheet for a code, followed by causing the code to be transmitted to the local computer, step 806. Thereafter, the routine executes the step 810 of making a determination as to whether or not printing should or should not occur. Assuming it is determined that printing should occur, the routine executes the step 812 of calling up, from the local computer, the information that is to be printed, followed by the step 814 of causing the module to print such information on the sheet. Thereafter the module executes the step 816 of feeding the sheet from the printing module. Assuming however, with reference to step 810, that a determination is made that nothing is to be printed on the sheet, step 810, then, the routine executes the aforesaid step 816 of feeding the sheet from the module. After the feeding step 816 the routine executes the successive steps 568 and 506 of transmitting a command executed message to the local computer and returning processing to idle.

Assuming that the sheet 12 is, as shown in FIG. 1d, one which has a marginal edge portion 17 which is to be separated from the sheet 12 before further processing, then, the sheet 12 would be fed to the trimming module 50A. Accordingly, the routing 600 hereinbefore discussed would be called up and executed as hereinbefore discussed.

Assuming the sheet from the sheet feeding or printing modules, 280 (FIG. 5) or 290, or from the trimming module 50A as the case may be, is fed to the stacking module 140 via one or both of the accumulating and folding modules, 80 and 110 the sheets would be processed a hereinbefore discussed in the course of discussing the software routine 850 of the stacking module.

Alternatively, any of the sheets processed by any two of the modules of FIGS. 2 and 5, except the web feeding module 22 (FIG. 2), may also be processed by the sheet assembling module 350 (FIG. 6). Assuming the provision of the sheet assembly module 350, and a request on command 922 (FIG. 9b) directed to the sheet assembling module routine 900, the routine 900 initially executes the step 902 of determining whether or not sheets are available from two different sources. If they are not, the routine returns processing to idle 506 to permit other requests or commands to be executed. Assuming that two sheets are received, the routine executes the step 904 of causing the modules input feeding structures to feed the sheets to the assembling or collating structure of the module. As the respective sheets are fed, the routine implements the step 906 of causing the respective codes marked on the sheets to be scanned, followed by implementing the step 908 of determining whether or not the scanned codes are related to one another or otherwise match. And, assuming that the codes match, the routine implements the successive steps of of causing the assembling or collating structure of the sheet assembling module to assemble or collate the sheets, step 910, and to feed the collation from the assembling module, step 912. If however, with reference to step 908 the respective codes of the sheets do not match, then, the routine executes the successive steps of causing an appropriate message, such as "no match" to be transmitted to the local computer terminal, followed by implementing a conventional shut down routine, step 916 and returning processing idle, step 506.

The collation from the assembling module (FIG. 4) may be fed either directly to the stacking module 140 (FIG. 2) or indirectly thereto via the folding module, and processed thereby in accordance with the discussion of the software routines pertaining to such modules.

In accordance with the objects of the invention, there has been described improvements in methods and apparatus for processing sheets, particularly off-line from an inserter, including methods and apparatus for matching coded sheets. In addition, there has been described portable apparatus for supporting sheets in a stack thereof for use and transport between sheet processing structures.

What is claimed is:

1. Apparatus for assembling sheets comprising:
   a. portable means for supporting a first plurality of sheets in a predetermined order in a stack, said portable means including memory means having stored therein a plurality of first codes listed in said predetermined order, each of said first codes including data identifying one of the sheets of said stack;
   b. means for receiving a second plurality of sheets respectively including a second code including sheet identifying data;
   c. means for comparing codes for inclusion of corresponding sheet identifying data;
   d. means for collating first and second sheets identified by codes including corresponding data.

2. The apparatus according to claim 1, wherein said sheet receiving means includes second portable means for supporting said second plurality of sheets in a second predetermined order in a second stack, said second portable means including second memory means having stored therein a plurality of said second codes listed in said second predetermined order, and each of said second codes including data identifying one of the sheets of said second stack.

3. The apparatus according to claim 1, wherein said second plurality of sheets is a plurality of collations, said receiving means including second means for supporting said plurality of collations in a second predetermined order in a second stack, said second supporting means including second memory means for storing therein a plurality of said second codes listed in said second predetermined order, and each of said second codes including data identifying one of the collations of said second stack.

4. The apparatus according to claim 3 including means for folding each collation in a manner such that one of said codes of each collation may be sensed.

5. The apparatus according to claim 4 including means for sensing the code of each collation.

6. The apparatus according to claim 1 including means for preventing operation of said apparatus when said codes do not include corresponding data.

7. The apparatus according to claim 6 including third means for supporting a plurality of collations in a third predetermined order in a third stack, said third supporting means including third memory means having stored therein a plurality of third codes listed in said third predetermined order, and each of said third codes including data identifying one of the collations of said third stack.

8. The apparatus according to claim 6, wherein said receiving means include means for supporting said plurality of sheets in a second stack, said apparatus including means for sensing the respective codes of the sheet of each of said first and second stacks, said comparing means providing a match indication when compared codes include corresponding data and a no match indication when compared codes do not include corresponding data, and said collating means responsive to a match indication for collating first and second sheets.

9. The apparatus according to claim 8 including said collating means responsive to a no match indication for preventing collation of first and second sheets.

10. The apparatus according to claim 1 including means for controlling the apparatus, said portable means removably interfaceable with said controlling means, and said controlling means including said comparing means.

11. Apparatus for assembling sheets comprising:
   a) first and second portable means for respectively supporting first and second stacks of sheets, each of said supporting means including memory means, the memory means of the first supporting means including a first list of codes each including data identifying a sheet therein in an order of stacking therein, the memory means of the second supporting means including a second list of codes each including data identifying a sheet therein in an order of stacking therein;
   b) means for comparing respective codes of the first and second lists for inclusion of matching sheet identifying data; and
   c) means for assembling sheets identified by codes including matching data.

* * * * *